United States Patent
Chen et al.

(10) Patent No.: US 10,341,158 B2
(45) Date of Patent: Jul. 2, 2019

(54) SEGMENT-BASED TRANSFORMS IN DIGITAL SIGNAL PROCESSING

(71) Applicant: Futurewei Technologies, Inc., Plano, TX (US)

(72) Inventors: Weizhong Chen, Frisco, TX (US); Tao Zhang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/597,357

(22) Filed: May 17, 2017

(65) Prior Publication Data
US 2018/0337808 A1 Nov. 22, 2018

(51) Int. Cl.
| | |
|---|---|
| H04K 1/10 | (2006.01) |
| H04L 27/28 | (2006.01) |
| H04L 27/26 | (2006.01) |
| H04B 7/04 | (2017.01) |
| H04L 25/02 | (2006.01) |

(52) U.S. Cl.
CPC ............ H04L 27/265 (2013.01); H04B 7/04 (2013.01); H04L 25/0232 (2013.01); *H04L 27/2628* (2013.01)

(58) Field of Classification Search
CPC ............. H04L 27/265; H04L 27/2628; H04L 25/0232; H04L 1/0079; H04B 7/04; H04B 10/61
USPC ........................................ 375/260, 316, 340
See application file for complete search history.

(56) References Cited

U.S. PATENT DOCUMENTS

| | | | |
|---|---|---|---|
| 7,983,352 B2 | 7/2011 | Li et al. | |
| 8,654,887 B2 | 2/2014 | Fazlollahi et al. | |
| 8,837,572 B2 | 9/2014 | Chen et al. | |
| 8,837,956 B1 * | 9/2014 | Zanoni | H04B 10/61 398/158 |
| 8,971,451 B2 | 3/2015 | Chen et al. | |
| 9,172,577 B2 | 10/2015 | Abdoli et al. | |
| 9,274,750 B2 | 3/2016 | Sun et al. | |

(Continued)

FOREIGN PATENT DOCUMENTS

CN 103559019 A 2/2014

OTHER PUBLICATIONS

International Search Report and Written Opinion dated Aug. 16, 2018 in International Patent Application No. PCT/CN2018/087042, 10 pages.

*Primary Examiner* — Phuong Phu
(74) *Attorney, Agent, or Firm* — Vierra Magen Marcus LLP

(57) ABSTRACT

A segment-based approach for fast fourier transforms of input signals is provided for the generation of baseband signals. A FFT is performed individually for each of the segments from the input signal and the FFT result from each segment is accumulated to provide a final FFT for an input signal symbol. After the samples are received for one segment, a FFT can be performed to generate an intermediate FFT result while samples for the additional segment(s) are received. The system accumulates the intermediate result from the segments into a final FFT result that can be used to generate the baseband signal. Segment-based processing of an input signal can provide faster and more efficient processing to generate a baseband signal. Segment-based processing can also decrease the required size of the input buffers for antennas.

18 Claims, 14 Drawing Sheets

(56) References Cited

U.S. PATENT DOCUMENTS

| | | |
|---|---|---|
| 9,497,053 B2 | 11/2016 | Zhang et al. |
| 2005/0223050 A1 | 10/2005 | Liu et al. |
| 2007/0033244 A1 | 2/2007 | Cohen et al. |
| 2010/0002816 A1 | 1/2010 | Mody et al. |
| 2011/0066427 A1 | 3/2011 | Konchitsky et al. |
| 2011/0080967 A1* | 4/2011 | Larsson ................ H04L 1/0079 375/260 |

* cited by examiner

SEGMENT-BASED TRANSFORMS IN DIGITAL SIGNAL PROCESSING

BACKGROUND OF THE INVENTION

Wireless radio links connect mobile phones and other devices to cellular networks, which also connect to the internet, providing basic voice communications and a wide variety of other services such as short messaging, email, internet access and other business applications. The radio coverage of a typical mobile phone application varies from a few hundred meters in small cell applications to several miles in macro-cell applications in rural areas. Wireless local area networks, referred to as "WiFi," enable portable computing devices such as laptop and smart phones to connect seamlessly to the internet. The coverage of WiFi is up to a hundred meters. Bluetooth is a wireless technology with even smaller coverage up to 10 meters. Bluetooth technology is widely used in mobile phones for wireless connection between peripheral devices and a mobile device nearby.

Wireless communication systems at each side of the radio link, regardless of coverage sizes, typically have at least one transmitter antenna and at least one receiver antenna. Typical antenna configurations include receiver diversity (two or more receiving antennas), transmitter beamforming (two or more transmitting antennas), and MIMO (Multiple Input and Multiple Output) (multiple transmitter and receiver antennas).

In mobile phone communications, one side of the communication link is a mobile station or user equipment while the other side is a base station. In the GSM-based 3GPP family, both GMSK (2G) and EDGE (2.5G) use receiver antenna diversity, while WCDMA (3G) and LTE (4G) use beamforming and/or MIMO. GMSK/EDGE typically involves time division multiple access (TDMA) (physical layer link) technology, WCDMA uses code division multiple access (CDMA) technology, and LTE uses orthogonal frequency division multiple access (OFDMA) technology for the downlink and single channel-frequency division multiple access (SC-FDMA) technology for the uplink.

SUMMARY

According to one aspect of the present disclosure, there is provided a device that includes: an antenna configured to receive a plurality of samples corresponding to a symbol of an input signal for baseband signal generation using a fast Fourier transform (FFT); and a signal processing circuit coupled to the antenna and configured to generate an intermediate FFT result for each of a plurality of segments of the plurality of samples, determine a final FFT result for the input signal symbol based on an accumulation of the intermediate FFT result for each of the plurality of segments, and generate the baseband signal based on the final FFT result.

Optionally, in any of the preceding aspects, a number of the plurality of segments of the plurality of samples is an even number.

Optionally, in any of the preceding aspects, an interval of each sample in the plurality of segments is equal to the number of the plurality of segments.

Optionally, in any of the preceding aspects, the signal processing circuit is further configured to interpolate the intermediate FFT result for each of the plurality of segments to generate an interpolated segment for each of the plurality of segments; and determine a final FFT result for the input signal symbol based on an accumulation of the interpolated segment for each of the plurality of segments.

Optionally, in any of the preceding aspects, the device further comprises a memory; wherein the signal processing circuit is configured to store a first segment of the plurality of samples in the memory; and wherein the signal processing circuit is configured to store a second segment of the plurality of samples in the memory after moving the first segment for generating an intermediate FFT result.

Optionally, in any of the preceding aspects, the signal processing circuit is configured to store the second segment of samples in the memory during generating the intermediate FFT result for the first segment of the plurality of samples.

Optionally, in any of the preceding aspects, the signal processing circuit includes a fast fourier transform (FFT) circuit configured to generate the individual FFT results and determine the final FFT result.

Optionally, in any of the preceding aspects, the signal processing circuit is further configured to generate an intermediate rotation FFT result for a rotation of each of the plurality of segments of the plurality of samples; and determine a final FFT result for the input signal symbol based on an accumulation of the intermediate FFT result for each of the plurality of segments and the intermediate rotation FFT result for the rotation of each of the plurality of segments.

According to one aspect of the present disclosure, there is provided a method for digital signal processing, comprising: sequentially receiving at a signal processing circuit a plurality of samples for an input signal in the time domain; storing a first segment of the plurality of samples in a memory; performing a fast fourier transform (FFT) for the first segment; storing a second segment of the plurality of samples in the memory after beginning the FFT for the first segment; performing a FFT for the second segment; and generating a baseband signal based on an accumulation of the FFT for the first segment and the FFT for the second segment.

Optionally, in any of the preceding aspects, storing the second segment of samples includes storing the second segment during said performing the FFT for the first segment.

Optionally, in any of the preceding aspects, performing a FFT for the first segment comprises: generating from the first segment a first subset of radio elements for the baseband signal; and interpolating the first subset of radioelements to generate a first set of radioelements having a number of radioelements that is greater than a number of samples in the first segment.

Optionally, in any of the preceding aspects, performing a FFT for the second segment comprises: generating from the second segment of samples a second subset of radioelements for the baseband signal; and interpolating the second segment of radioelements to generate a second set of radioelements having a number of radioelements that is greater than a number of samples in the second segment.

Optionally, in any of the preceding aspects: generating the first subset of radioelements includes performing a first FFT for a first sequence of the first segment of samples and performing a second FFT for a second sequence of the first segment of samples; and performing the second FFT for the second sequence includes applying a rotation to the first segment of samples.

Optionally, in any of the preceding aspects, the method further comprises accumulating the FFT of the first segment and the FFT of the second segment by adding the first set of radioelements and the second set of radioelements.

According to one aspect of the present disclosure, there is provided a non-transitory computer-readable medium storing computer instructions for digital signal processing, that when executed by one or more processors, cause the one or more processors to perform the steps of: receive a plurality of samples corresponding to a symbol of an input signal for generating a baseband signal using a fast fourier transform (FFT); generate an intermediate FFT result for each of a plurality of segments of the plurality of samples; determine a final FFT result for the input signal symbol based on a combination of the intermediate FFT result for each of the plurality of segments; and generate the baseband signal based on the final FFT result.

Optionally, in any of the preceding aspects, the instructions cause the one or more processors to perform the steps of: store a first segment of the plurality of samples in a memory; and store a second segment of the plurality of samples in the memory after moving the first segment for generating an intermediate FFT result.

Optionally, in any of the preceding aspects, the instructions cause the one or more processors to perform the step of: store the second segment of samples in the memory during generating the intermediate FFT result for the first segment of the plurality of samples.

Optionally, in any of the preceding aspects, the step of generate an intermediate FFT result for the first segment comprises the steps of: generate from the first segment of samples a first subset of radio elements for the baseband signal; and interpolate the first subset of radio elements to generate a first set of radio elements having a number of radio elements that is greater than a number of samples in the first segment.

Optionally, in any of the preceding aspects, the step of generate an intermediate FFT result for the second segment comprises: generate from the second segment of samples a second subset of radio elements for the baseband signal; and interpolate the second segment of radio elements to generate a second set of radio elements having a number of radio elements that is greater than a number of samples in the second segment.

Optionally, in any of the preceding aspects, the step of generate the first subset of radio elements includes the steps of perform a first FFT for a first sequence of the first segment of samples and perform a second FFT for a second sequence of the first segment of samples; and the step of perform the second FFT for the second sequence includes the step of apply a rotation to the first segment of samples.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
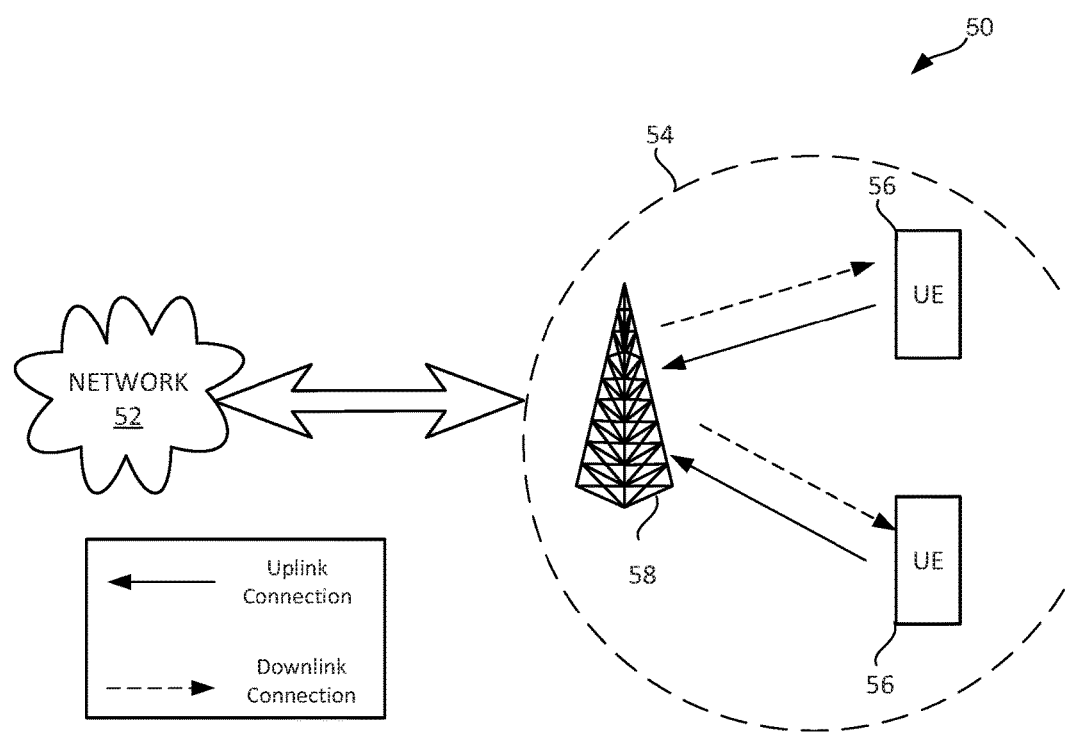
FIG. 1 is a block diagram of a network communication environment.

The disclosure relates to technology for wireless communications, including the re-creation or generation of baseband signals in the frequency domain from input signals in the time domain. For example, the disclosure may have application in wireless communications that use orthogonal frequency division multiplexing (OFDM) as a waveform structure, but may be used in any suitable environment where signal transformations are employed. OFDM and other implementations can be provided using fast Fourier transform (FFT) in the receiver path and inverse FFT (IFFT) in the transmission path.

According to one embodiment, a plurality of samples corresponding to a symbol of an input signal for baseband signal generation using a fast Fourier transform (FFT) is received. An intermediate FFT result is generated as a segment of the samples of the signal is received, and the intermediate FFT is accumulated to the final FFT of the symbol. As the intermediate FFT of the last segment of the symbol signal is accumulated to the final FFT, the FFT of the symbol is achieved.

A segment-based FFT process is provided for the transformation of input signals to recreate baseband signals in the frequency domain. An input signal may include a stream including a sequence of samples. Typically, a symbol encoded in the input signal is represented by a predetermined number of samples in the input signal. To facilitate a fast transformation using minimal physical resources, a segment-based FFT process is provided that generates intermediate FFT results for segments of an input signal symbol. Multiple intermediate results may be generated for a single input signal symbol. The intermediate results correspond to individual segments of samples for the symbol. The intermediate results for each segment are accumulated as individual segments are received to provide a final FFT result.

The segment-based approach may decrease the time to generate a FFT result for an input signal, and thereby decrease the overall time to generate the baseband signal. When the number of samples for a segment is received, an FFT is calculated for the segment and an intermediate result generated. At the same time, samples for the next segment continue to be received and stored in the input buffer. The intermediate results are accumulated with any previous results each time a new intermediate FFT result is generated. When the final segment is processed, the calculation time will be much shorter than the typical calculation time required to compute the FFT for the entire symbol. Because the FFT is only calculated for the segment, a much shorter processing time is required. The intermediate result for the final segment is accumulated with the previous results to generate the final FFT result.

Additionally, the segment-based approach may decrease the memory requirements for a FFT implementation. Typically, an input buffer for an FFT unit is configured to store the predetermined number of samples for a symbol of the input signal. With a segment-based approach, the input buffer can be decreased in sized as the number of samples for a segment of the symbol is all that is stored at a given time.

In one embodiment, an FFT calculation is performed for a segment which represents less than the full number of samples or points for a symbol. The result of the FFT calculation can be interpolated to provide a larger number of radio elements in the intermediate FFT result than samples in the input signal segment. In another embodiment, multiple FFT calculations are performed for a single segment to reduce the amount of interpolation that is performed, or to remove interpolation from the generation of FFT results.

FIG. 1 illustrates a network environment 50 for communicating data. Network 50 includes a base station 58 including one or more antennas having a coverage area 106. Base station (BS) 58 may include a communications controller. Network environment 50 includes a plurality of user equipments (UEs) 56, and a network 52 such as a backhaul network. Two UEs are depicted, but many more may be present. A communications controller at base station 58 may be any component capable of providing wireless access by, inter alia, establishing uplink (dashed line) and/or downlink (dotted line) connections with UEs 56. Base station 58 may include an enhanced base station (eNB), a picocell, a femtocell, and other wirelessly enabled devices. UEs 56 may be any component capable of establishing a wireless connection with BS 58, such as cell phones, smart phones, tablets, sensors, etc. Network 52 may be any component or collection of components that allow data to be exchanged between BS 58 and a remote end (not shown). In some embodiments, the network 52 may comprise various other wireless devices, such as relays, femtocells, etc.

Figure 2:
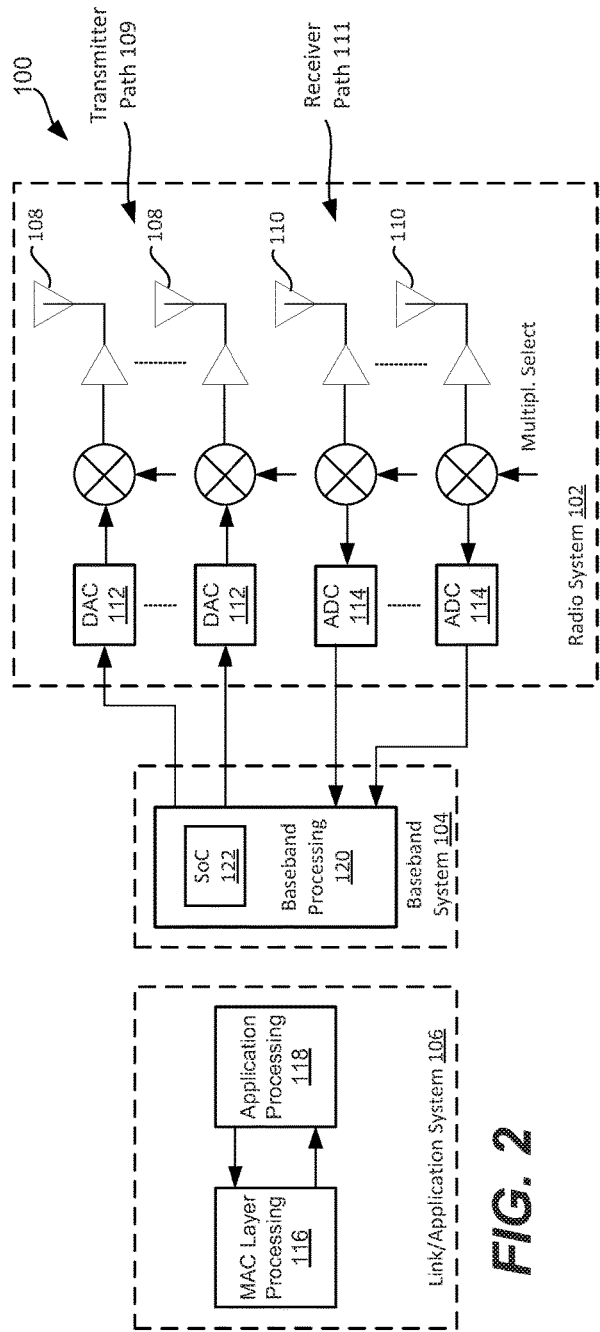
FIG. 2 is a block diagram depicting an example of a communication system.

FIG. 2 illustrates an example of a communication system 100 that may be implemented with segment-based baseband signal processing system according to this disclosure. In the following description, reference is made to communication systems that conform to one or more communication specifications/standards. However, the baseband signal processing system may be implemented with any suitable type of communication system that transmits and receives data in a digital format.

The communication system 100 includes a radio or RF sub-system 102 including a transceiver with a transmitter path 109 and a receiver path 111. The RF sub-system 102 may also be referred to as a "RF front-end." The transmitter path 109 of the RF front-end 102 receives digital baseband signals generated by a baseband signal processing system 104, upconverts the signals, and transmits them as RF signals (e.g., within an RF carrier) via one or more antennas 108. The receiver path 111 receives RF signals via the one or more antennas 110 and downconverts the RF signals into digital baseband signals for subsequent processing by the baseband signal processing system 104.

Though digital-to-analog converters (DAC) 112 and analog-to-digital converters (ADC) 114 are shown physically or logically as part of the RF front-end 102, they may alternatively be considered part of the baseband signal processing sub-system 104 instead.

A Link/Application sub-system 106 includes a Media Access Control (MAC) processing system 116 responsible for assembling user information (data) streams into packets for RF transmission, and extracting information streams for each user from the received data stream. An application processing system 118 is related to user applications such as multimedia processing within the communication system 100.

The communication system 100 may be implemented as either a mobile/fixed user station or a base station. In the receiver path, the radio frequency sub-system (RF front-end) downconverts the radio frequency (RF) signal down from carrier frequency to baseband; and in the transmitter path, the RF sub-system shifts the baseband signal to the carrier frequency for RF transmission. The baseband system is normally called the "physical layer" of the communication system. A Multiple Access Control (MAC) sub-system is responsible for assembling user information streams into packets for RF transmission, and extracting information streams for each user from the received data stream. The application processing is related to user applications such as multimedia processing.

According to certain embodiments of the present disclosure, baseband system 104 includes a baseband processing unit 120. Unit 120 may include a system on chip (SoC) 122 configured to perform a baseband signal processing process for received and/or transmitted signals. Details of the SoC 122 will be described in detail herein below. The SoC may include a signal processing circuit. The signal processing circuit may include a digital signal processor and/or specialized circuits such as a hardware acceleration circuit (HAC) configured to perform the functions described herein.

Figure 3:
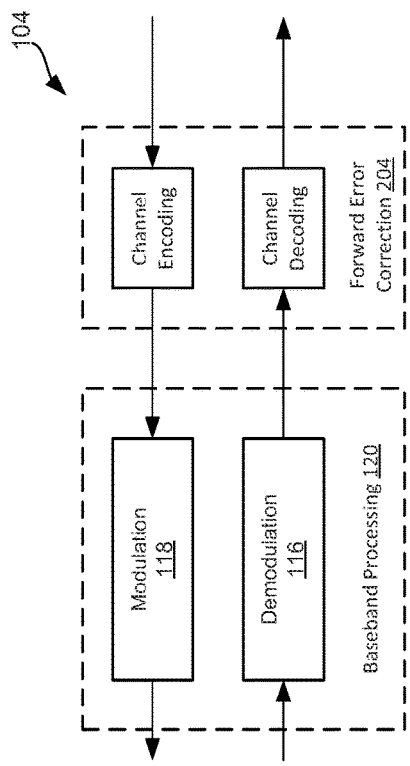
FIG. 3 is a block diagram depicting an example of components of baseband system.

FIG. 3 illustrates an example of several components that comprise a baseband system 104 as described in FIG. 2, according to one embodiment. Baseband system 104 includes a baseband processing unit 120 and a forward error correction (FEC) unit 204. The FEC unit 204 in the transmission path performs channel encoding that introduces redundant bits into the user information bit streams and channel decoding on the receiver path that uses the redundant bits to correct errors incurred by the mobile channel. The baseband processing unit 120 in the transmission path functions to generate a baseband signal for RF transmission from the encoded bit streams. The baseband signal processing unit 120 in the receiver path functions to recover the transmitted bit steams from the received baseband signal.

Baseband processing unit 120 may be implemented using software (SW) within a digital signal processing system, such as a digital signal processor (DSP) and/or in hardware application specific integrated circuits (ASIC), commonly called hardware accelerators or hardware acceleration circuits (HAC). Floating point and/or fixed-point calculations can be used. A signal processing circuit may refer to a digital signal processor (DSP) and/or one or more integrated circuits.

Figure 4:
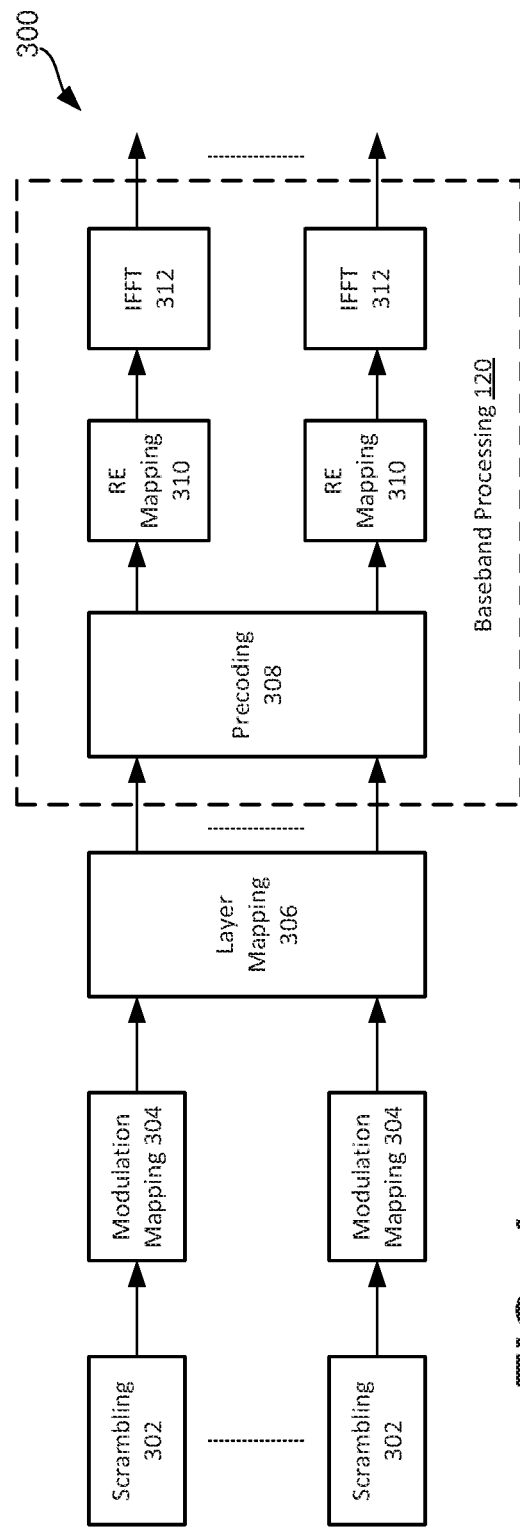
FIG. 4 is a block diagram of an example of a baseband signal processing system for OFDM based transmission.

FIG. 4 illustrates one example of a baseband signal processing system 300. By way of example, system 300 may be used to implement an Enhanced Data for GSM Evolution (EDGE), Code Division Multiple Access (WCDMA) and Long-Term Evolution (LTE) technologies, respectively, according to embodiments of the present disclosure. Implementation of these baseband signal processing systems for transmission may follow standards such as the 3GPP specifications/standards. However, the different portions of the chain may be implemented using different SW/HW partitions for various tradeoff considerations. To comply with the radio spectrum specifications/standards and to increase the power amplifier efficiency for RF transmission, the baseband signal processing may also include pre-distortion processing in EDGE and LTE radio transmission.

One or more data streams are received and scrambled in one or more scrambling units 302. The data is modulated and mapped in one or more modulation mapping units 304, and layer mapped using a layer mapping unit 306. As will be appreciated, these processes are typically performed by the link/application sub-system 106. The scrambled and mapped data is received by the baseband processing unit 120.

Within the baseband processing unit 120, the received data is precoded using a precoding unit 308, radio element (RE) mapped using one or more RE mapping units 310, and transformed using one or more inverse Fast Fourier Transform (IFFT) units 312 to generate the digital baseband signal. The generated baseband signal is then forwarded to a RF front-end for RF transmission. It will be understood that the baseband signal processing that generates the baseband signal may be performed by the SoC 122 described above.

Figure 5:
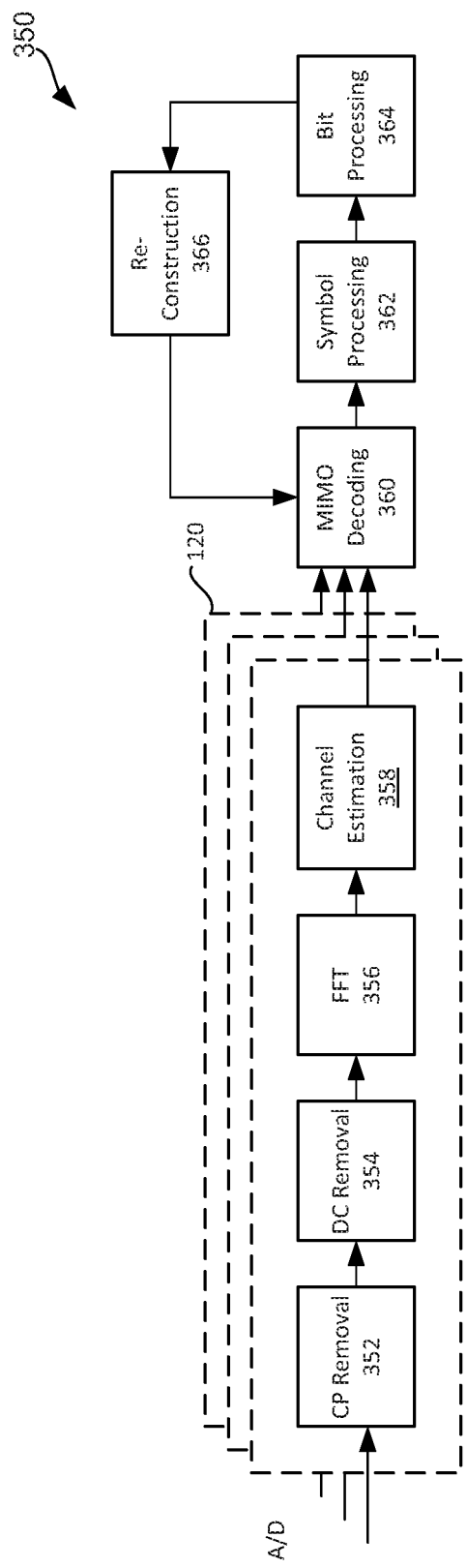
FIG. 5 is a block diagram of an example of a baseband signal processing system for an OFDM based receiver.

FIG. 5 illustrates an example baseband signal processing system 350. By way of example, system 350 may be implemented within a receiver implementing EDGE, WCDMA, and LTE, respectively, according to embodiments of the present disclosure. The baseband signal processing system 350 receives one or more steams from a RF front end. Various processing is performed on the received signals, including cyclic prefix (CP) removal process using a CP removal unit 352 and a DC components removal process using a DC removal unit 354. A Fast Fourier Transform (FFT) process is then performed using a FFT unit 356 and a channel estimation process is performed using a channel estimation unit 358 to generate the recovered digital baseband signals.

The recovered digital baseband signal is further processed by the link/application system 106, which may include a MIMO decoding unit 360, symbol processing unit 362, a bit processing unit 364, and a reconstruction unit 366 to recover the underlying transmitted digital data.

Figure 6:
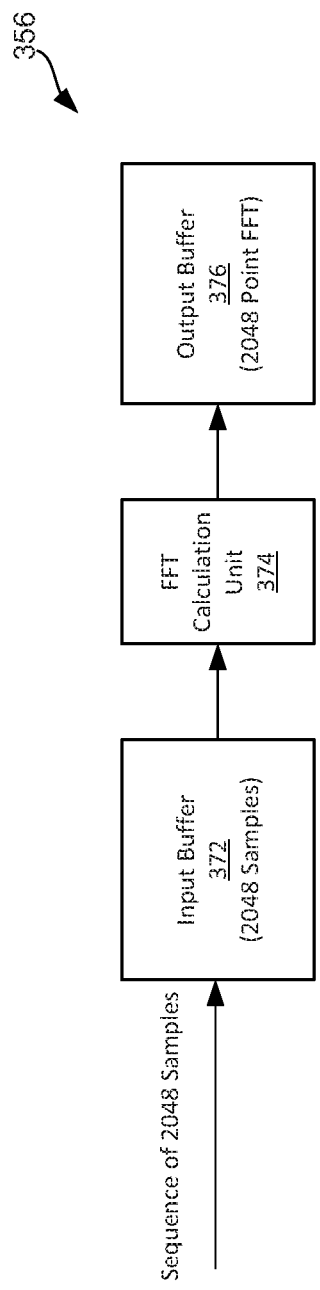
FIG. 6 is a block diagram of an example of a fast Fourier transform (FFT) unit.

FIG. 6 is a block diagram describing one example of a FFT unit 356. FFT unit 356 includes an input buffer 372, FFT calculation unit 374, and an output buffer 376. Although input buffer 372 and output buffer 376 are shown as part of the FFT unit, they may be implemented outside of the FFT unit 356 in other examples.

The FFT unit 356 receives one or more input signals from a RF front end as described above. In one example, the input signal is a stream that is received as a sequence of samples. In FIG. 6 an example is shown where the input signal is a sequence of 2048 samples, however, any number of samples may be used according to an implementation. For examples, various standards or protocols may specify that an input signal have a predetermined number of samples or points that comprise a symbol for the baseband signal. The number of samples corresponding to a symbol of the input signal is equal to the number of sub-carriers of the input signal.

The sequence of samples is temporarily stored in input buffer 372 before being transferred to FFT calculation unit 374 for processing. More specifically, the individual samples are stored in the input buffer as they are received. After receiving the predetermined number of samples for a symbol, in this case 2048, the FFT unit transfers the input signal to the FFT calculation unit 374. The FFT calculation unit 374 performs a fast fourier transform of the input signal using the predetermined number of samples. The FFT calculation unit 374 generates a set of radio elements (REs) for the baseband signal. In this case, the FFT calculation unit 374 generates a 2048 point FFT result. The 2048 point FFT result includes 2048 REs for the baseband signal. The FFT result may be referred as a 2048 point FFT in relation to its comprising 2048 radio elements. The FFT result is then stored in an output buffer as the 2048 REs. It is noted that the 2048 REs may be reduced to 1200 REs in embodiments, where select radio elements are used as guard band, rather than to store user data.

As shown in FIG. 6, the input and output buffers are both configured to hold the sequence of samples and the FFT result in accordance with the specified number of samples for a symbol. The input buffer 372 is configured to accumulate 2048 samples before transferring the samples to the FFT calculation unit 374 to generate an FFT result having 2048 points or REs. Accordingly, the input buffer 372 must be large enough to hold the predetermined number of samples. Additionally, the FFT calculation unit 376 is configured to wait unit all of the samples for a symbol are received before the FFT processing can begin.

Processing an input signal according to the predetermined number of samples for a symbol of the corresponding baseband signal may lead to inefficiencies. The system may spend significant time waiting for the predetermined number of samples to accumulate before processing for a symbol can begin. Such structures may have difficulty meeting the strict time demands required in future generation wireless technologies. For example, new standards may require much shorter time durations for symbol processing, while also specifying larger bandwidths. Additionally, accumulating all of the samples for a symbol requires a large input buffer for each antenna. The input buffers in these implementations have a capacity large enough to hold of the samples of an input signal for a FFT.

In accordance with one embodiment, a segment-based fast fourier transform of an input signal is provided for the generation of a baseband signal. A FFT is performed individually for each of the segments from the input signal and the FFT result from each segment is accumulated to provide a final FFT for the input signal. Consider for example, an input signal having a predetermined number of samples for a symbol used in performing a FFT to generate a baseband signal. The predetermined number of samples can be divided into a plurality of equal-sized segments (e.g., two or four, etc.) of samples. After the samples are received for a first segment, a FFT can be performed for the first segment. The FFT for the first segment generates an intermediate FFT result that will later be accumulated with the intermediate result from other segments. In one embodiment, the intermediate result for the first segment is stored in an output buffer.

While performing the FFT for the first segment, samples for the additional segment(s) continued to be received. After the samples are received for a second segment, an FFT is performed for the second segment. The FFT for the second segment generates a second intermediate FFT result. The system accumulates the intermediate result from the first segment and the next segment. In one embodiment, the accumulated result for the first and second segments is stored in the output buffer. This process is repeated until all of the segments for the input signal have been processed by the FFT unit. The accumulated FFT result is then provided, e.g., to a channel estimation unit before being passed to a link/application system, for example.

Segment-based processing of an input signal can provide faster and more efficient processing to generate a baseband signal. The system can begin performing a FFT when a segment of samples for an input signal is received. This permits the system to begin FFT processing prior to receiving all of the samples for the input signal. The results of each segment are accumulated to generate a final result. For example, the system can add the individual radio elements from each segment FFT result to create a final FFT result. For example, processing an input signal may complete earlier by ¾ of a symbol if a four segment approach is applied. Additional processing, such as adders and/or multipliers to accumulate the FFT result, may be provided. Nevertheless, the time that is saved based on beginning the FFT calculations earlier is significantly larger than the time to accumulate the individual FFT results.

Segment-based processing of an input signal can also decrease the required size of the input buffers for antennas. In one embodiment, the input buffer can be reduced in size to store the number of samples in a segment, rather than the number of samples for a complete symbol.

Figure 7:
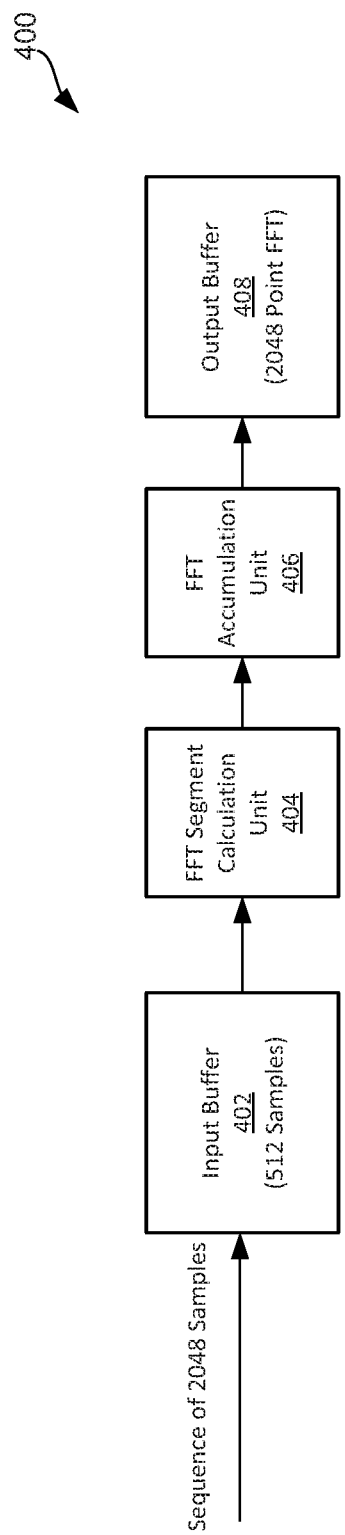
FIG. 7 is a block diagram of a FFT unit in one embodiment including an FFT segment calculation unit and accumulation unit.

FIG. 7 is a block diagram depicting a fast Fourier transform (FFT) unit 400 configured for segment-based FFT processing to generate a baseband signal accordance with one embodiment. FFT unit 400 may be used to implement FFT 356 in FIG. 5. FFT unit 400 may be implemented as part of a baseband signal processing system such as in a signal processing circuit. In one embodiment, the signal processing circuit includes a digital signal processor (DSP), including software for example. In one embodiment, the signal processing circuit includes a hardware acceleration circuit (HAC) or other hardware circuit.

FFT unit 400 includes an input buffer 402, FFT segment calculation unit 404, FFT accumulation unit 406, and output buffer 408. Although input buffer 402 and output buffer 408 are shown as part of the FFT unit, they may be implemented outside of the FFT unit 400 in other examples. Input buffer 402 is configured to store samples from an input signal, such as a stream received over a wireless communication link. The input signal includes a predetermined number of samples that comprise a symbol in the input signal. The predetermined number of samples is used in the recreation of a symbol in the baseband signal using a fast Fourier transform (FFT) of the predetermined number of samples. In this example, the predetermined number of samples for the FFT to recreate the baseband signal is 2048.

Input buffer 402 has a capacity or size to hold 512 samples rather than a capacity to hold the full 2048 samples needed to generate the symbol for the baseband signal. The size of the input buffer corresponds to the size of a segment of the input signal in one embodiment. For example, if four segments are to be used in calculating the FFT, the input buffer can have a capacity to hold ¼ of the number of samples in the input signal for a symbol. In this particular example, the input buffer is configured to hold 512 samples, corresponding to ¼ of the 2048 samples for a symbol used in generating the baseband signal. The reduced input buffer size is facilitated by the use of segments. The input buffer need only hold the number of samples for one segment. The use of 2048 samples and four segments is provided by way of example only. Any number of samples and segments can be used.

After the number of samples for a segment are received in input buffer, FFT unit 400 transfers the samples for the segment to FFT segment calculation unit 404. This frees the input buffer 402 to begin storing the first sample from the next segment. FFT calculation unit 404 performs a FFT for the samples in the received segment. Various techniques can be used to perform a segment-based FFT for a segment including less than all of the predetermined number of samples for a symbol as hereinafter described. A segment FFT calculation may calculate an FFT using all of the samples in the segment of samples or only a portion of the samples in the segment. In one example, an FFT calculation is performed for a subset of the samples and interpolation is used to generate an intermediate FFT result for the segment. The intermediate result includes REs for generating the baseband signal. The number of REs for the intermediate FFT result is greater than the number of samples in the segment in one embodiment. In one embodiment, an FFT calculation is performed for multiple portions, such as different sequences of samples for the segment. The results from each sequence are combined to generate the intermediate FFT result for the segment. In one example, the multiple FFT calculations utilize all of the samples for the segment so that interpolation is not applied. In one embodiment, the number of REs in the intermediate FFT result is equal to the predetermined number of samples. In another embodiment, the number of REs in the intermediate FFT result is less than the predetermined number of samples. For example, zero padding is often used, for example, so that only 1200 out of 2048 points are used in an FFT symbol. Accordingly, the number of REs in the intermediate result may be equal to this reduced number of points corresponding to actual user data without the zero padded points.

The intermediate result for each segment is provided from the FFT segment calculation unit 404 to the FFT accumulation unit 406. When the result is passed from the calculation unit 404, the next segment from the input buffer is passed into the calculation unit, and another segment begins being stored in the input buffer.

The accumulation unit 406 receives the intermediate FFT results for each segment and accumulates them to generate a final FFT result for a symbol. Unit 406 may accumulate the intermediate result from each segment with a previous result. Unit 406 may include an adder in one embodiment that adds the individual points from the intermediate FFT results to generate a final FFT result. Various techniques for accumulating intermediate FFT results to generate a final FFT can be used.

Output buffer 408 stores the final FFT result for a symbol. Output buffer 408 may also store intermediate FFT results and accumulated FFT results. For example, the FFT result for a first segment may be stored in output buffer 408. When the next FFT result is received, it can be accumulated with the first segment result and the accumulated result stored back in the output buffer. This processor can be repeated until all of the intermediate FFT results have been accumulated into a final FFT result for the symbol.

The units of FIG. 7 may include or be formed as part of any suitable processing device. The units of FIG. 7 may include or be formed as part of signal processing circuit such as baseband processing system 120 (e.g., a DSP). The various units could be implemented with any combination of hardware and/or software. In some example embodiments, the apparatus may further include one or more elements for performing any one or combination of steps described herein. In accordance with various embodiments of the present disclosure, the methods described herein may be implemented using a hardware computer system that executes software programs.

An input signal of N connected segments of signal with an equal sampling rate and different delays can be expressed by Equation 1.

$$x(n) = x_1(n-\tau_1) + x_2(n-\tau_2) + \ldots + x_N(n-\tau_N) \quad \text{Equation 1}$$

x(n) is an input signal made up of a plurality of segments $x_1$, $x_2$, $x_3$, etc. Each input signal segment can be calculated based on n and z, where both are integers. In an example, where the number M of input samples for a symbol is 2048, and four segments are used, n=0-2047, $\tau_1=0$, $\tau_2=512$, $\tau_3=1024$, and $\tau_4=1536$. Then, $x_1$ is not zero when n equals 0 to 511, $x_2$ is not zero when n equals 512 to 1023, $x_3$ is not zero when n equals 1024 to 1535, and $x_4$ is not zero when n equals 1536 to 2047, If zeros padding is applied to M for each segment, the discrete time fourier transform (DTFT) for the baseband signal X(k) can be expressed as shown in Equation 2.

$$X(k) = \sum_{k=0}^{M-1} x(n) e^{-j\frac{2\pi}{M} nk} \quad \text{Equation 2}$$

Expanding Equation 2 for the segments is shown in Equation 3.

$$(k) = \sum_{k=0}^{M-1} x(n) e^{-j\frac{2\pi}{M} nk} \quad \text{Equation 3}$$

Equation 3 can then be reduced as shown in Equation 4 and Equation 5, providing the final expression for the baseband signal shown in Equation 6.

$$= e^{-j\frac{2\pi}{M}\tau_1 k} \sum_{n=0}^{M-1} x_1(n) e^{-j\frac{2\pi}{M} nk} + \quad \text{Equation 4}$$

$$e^{-j\frac{2\pi}{M}\tau_2 k} \sum_{n=0}^{M-1} x_2(n) e^{-j\frac{2\pi}{M} nk} + \ldots + e^{-j\frac{2\pi}{M}\tau_N k} \sum_{n=0}^{M-1} x_N(n) e^{-j\frac{2\pi}{M} nk}$$

$$= e^{-j\frac{2\pi}{M}\tau_1 k} FFT(x_1, M) + \quad \text{Equation 5}$$

$$e^{-j\frac{2\pi}{M}\tau_2 k} FFT(x_1, M) + \ldots + e^{-j\frac{2\pi}{M}\tau_N k} FFT(x_N, M)$$

$$= \sum_{i=1}^{N} e^{-j\frac{2\pi}{M}\tau_i k} FFT(x_i, M) \quad \text{Equation 6}$$

If the parameters of M=2048 and $\tau_1=0$, $\tau_2=512$, $\tau_3=1024$, and $\tau_4=1536$ are applied, the output baseband signal can be expressed as shown in Equation 7.

$$X(k) = FFT(x_1, 2048) + (-j)^k FFT(x_2, 2048) + (-1)^k FFT(x_3, 2048) + (j)^k FFT(x_4, 2048) \quad \text{Equation 7}$$

If k is set to 4l, then the output signal $X_i(4l)$ can be expressed as shown in Equation 8.

$$X_i(4l) = \sum_{m=0}^{512} x_i(m) e^{-j\frac{2\pi}{M} m 4l} = \sum_{m=0}^{512} x_i(m) e^{-j\frac{2\pi}{512} ml} = FFT(x_i, 512), \quad \text{Equation 8}$$

$$i = 1, 2, 3, 4$$

Figure 8:
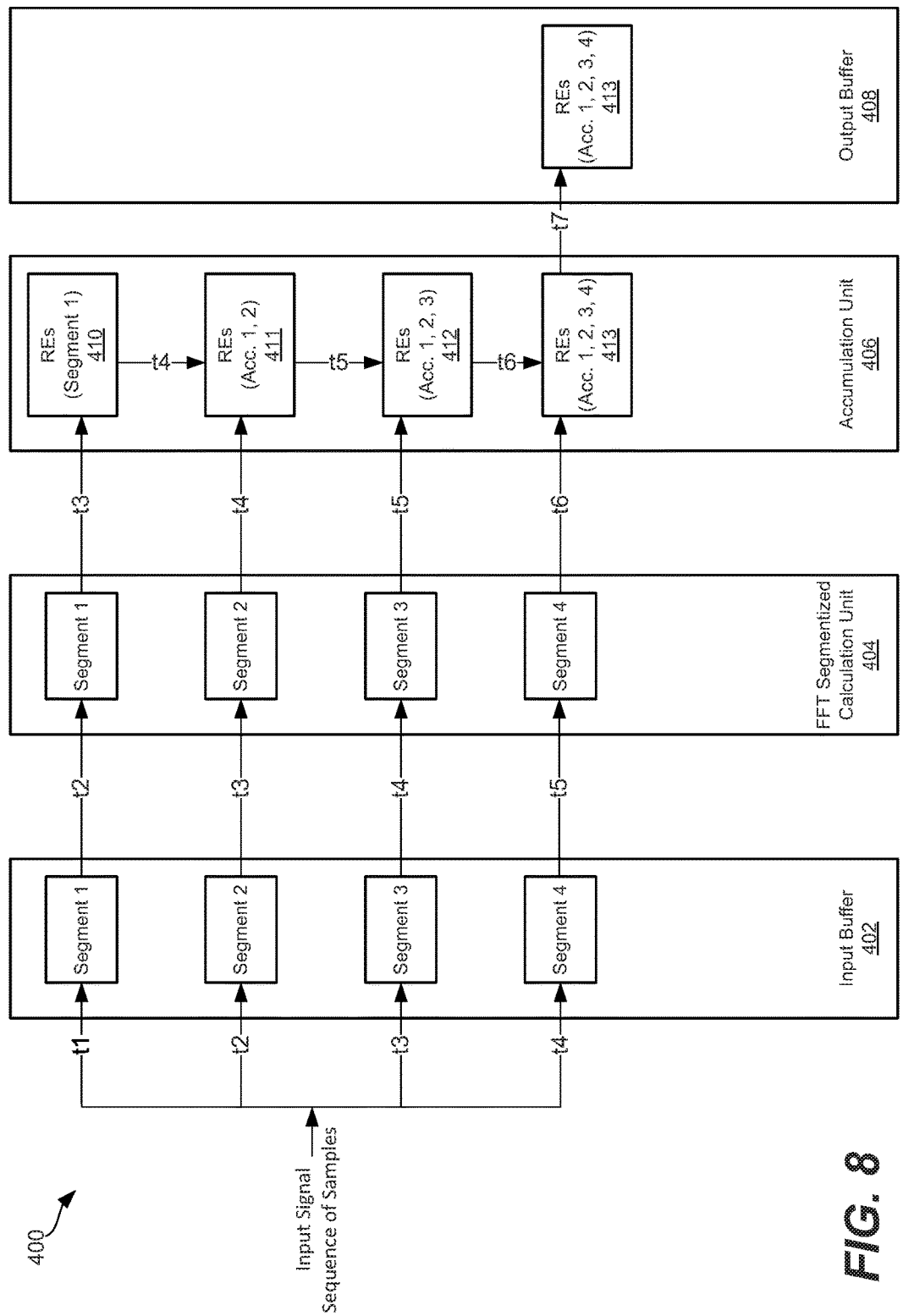
FIG. 8 is a block diagram of a FFT unit in one embodiment, describing an example of a segment-based FFT process.

FIG. 8 is a block diagram of FFT unit 400 in accordance with one embodiment, depicting an example of the flow of segments and FFT results for segment-based processing. An example is provided where an input signal includes a predetermined number (e.g., 2048) of samples for an input signal symbol. The samples for a symbol are divided or partitioned into four segments of 512 samples each for segment-based FFT processing.

The input signal is received as a sequence of samples. The samples are stored as they are received into input buffer 402. The first 512 samples are stored as Segment 1 into the input buffer 402 at time t1. After 512 samples have been received and stored, they are transferred from the input buffer to the FFT segment calculation unit 404 at time t2. Transferring the samples may refer to copying the samples to the calculation unit without removing them from the input buffer, or removing them from the input buffer to the calculation unit.

Also at time t2, the samples for Segment 2 start being stored into input buffer 402. The samples for Segment 2 can be stored in the same memory location as the samples for Segment 1. The samples for Segment 1 are transferred to calculation unit 404 so that the memory location is free to receive the samples for Segment 2. The samples for Segment 2 continue to be stored in the input buffer 402 at time t2 as the FFT is performed for Segment 1 at the calculation unit 404.

After the FFT is completed for Segment 1, the intermediate FFT result is transferred from the calculation unit 404 at time t3. The intermediate FFT result, shown in box 410 as the REs for segment 1, is transferred to accumulation unit 406. Although not shown, accumulation unit 406 or calculation unit 404 may store the intermediate result 410 in output buffer 408 until additional FFT results are received for accumulation.

Also at time t3, Segment 2 is transferred from the input buffer 402 to the calculation unit 404, again freeing input buffer 402 to store samples for the next segment. The samples for Segment 3 begin to be stored in input buffer 402 at time t3.

After the FFT is completed for Segment 2, the intermediate FFT result is transferred from the calculation unit 404 to accumulation unit 406 at time t4. The accumulation unit 406 accumulates the intermediate FFT result 410 for Segment 2 with the intermediate result for Segment 1 to generate an accumulated result 411. The accumulated result may be obtained by adding the individual REs from the intermediate results for the two segments. Although not shown, accumulation unit 406 may store the accumulated result 411 in output buffer 408 until additional FFT results are received for accumulation.

Also at time t4, Segment 3 is transferred from the input buffer 402 to the calculation unit 404. The samples for Segment 4 begin to be stored in input buffer 402 at time t4.

After the FFT is completed for Segment 3, the intermediate FFT result is transferred from the calculation unit 404 to accumulation unit 406 at time t5. The accumulation unit 406 accumulates the accumulated result 411 for segments 1 and 2 with the intermediate result for segment 3 to generate an accumulated result 412. The accumulated result may be obtained by adding the individual REs from the intermediate result for Segment 3 with the accumulated REs 411 for Segments 1 and 2.

Also at time t5, Segment 4 is transferred from the input buffer 402 to the calculation unit 404. After the FFT is completed for Segment 4, the intermediate FFT result is transferred from the calculation unit 404 to accumulation unit 406 at time t6. The accumulation unit 406 accumulates the accumulated result 412 for Segments 1, 2, and 3 with the intermediate result for Segment 4 to generate an accumulated result 413. The accumulated result may be obtained by adding the individual REs from the intermediate result for Segment 4 with the accumulated REs 412 for Segments 1, 2, and 3. The accumulated result 413 is the final FFT result for the predetermined number of samples comprising a symbol of the input signal. The final FFT result 413 is stored in the output buffer 408 at time t7.

Figure 9:
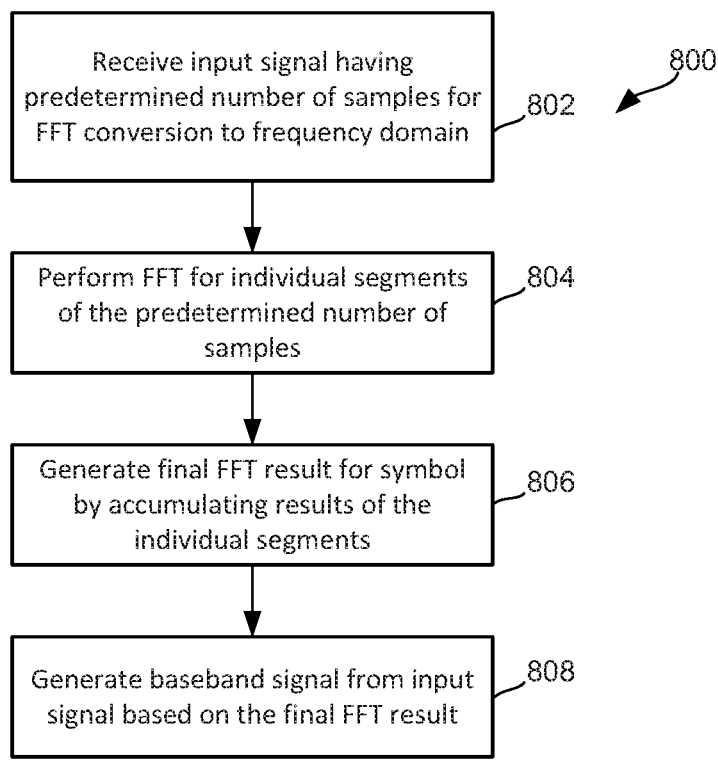
FIG. 9 is a flowchart describing the generation of a baseband signal using a segment-based FFT process in one embodiment.

FIG. 9 is a flowchart describing a process 800 of generating a baseband signal from an input signal using a segment-based FFT calculation in accordance with one embodiment. Process 800 may be performed in the environment of FIG. 1 using a FFT segment calculation unit 404. Process 800, however is not limited to being performed in such an environment. Process 800 may be performed by various elements in FIG. 7, but is not limited to such an example. Process 800 may be performed as part of generating a final FFT result as described in processes 420, 600, 650, 700, and 720 hereinafter. Process 800 may be performed by a segment calculation unit and/or accumulation unit implemented as one or more circuits, in a hardware acceleration circuit for example. Alternatively, the process may be implemented in a digital signal processor, as processor readable code for programming a process for example.

At step 800, an input signal is received. The input signal is received by a receiver in one embodiment. The input signal may include a stream of samples that is provided to a baseband signal processing system 120 in one embodiment. In one example, the input signal is in the time domain and includes a predetermined number of samples comprising a symbol of the input signal. The symbol may correspond to a unit of samples to which a FFT is applied to generate a baseband signal from the input signal. The predetermined number of samples may be used to generate a symbol for the baseband signal.

At step 804, a fast Fourier transform (FFT) is performed for individual segments of the predetermined number of samples of the input signal. The samples for a symbol may be divided into segments, with each segment including less than all of the predetermined number of samples. At step 802, the system may complete receiving the samples for a first segment prior to receiving the samples for a second segment. Accordingly, step 804 may include performing a FFT one or more of the segments prior to receiving all of the predetermined number of samples for the symbol. Step 804 includes generating an individual FFT result for each of the segments.

At step 806, the individual FFT results for each segment are accumulated to generate a final FFT result for the symbol. Step 806 may include adding corresponding radio elements (REs) from the FFT result for each of the segments. The result of step 806 is a final FFT result for the symbol that is generated from a plurality of FFT results for individual segments of the symbol.

At step 808, a baseband signal is generated from the input signal based on the final FFT result. Step 808 can include passing the FFT result to a channel estimation unit and then to a link/application system.

Figure 10:
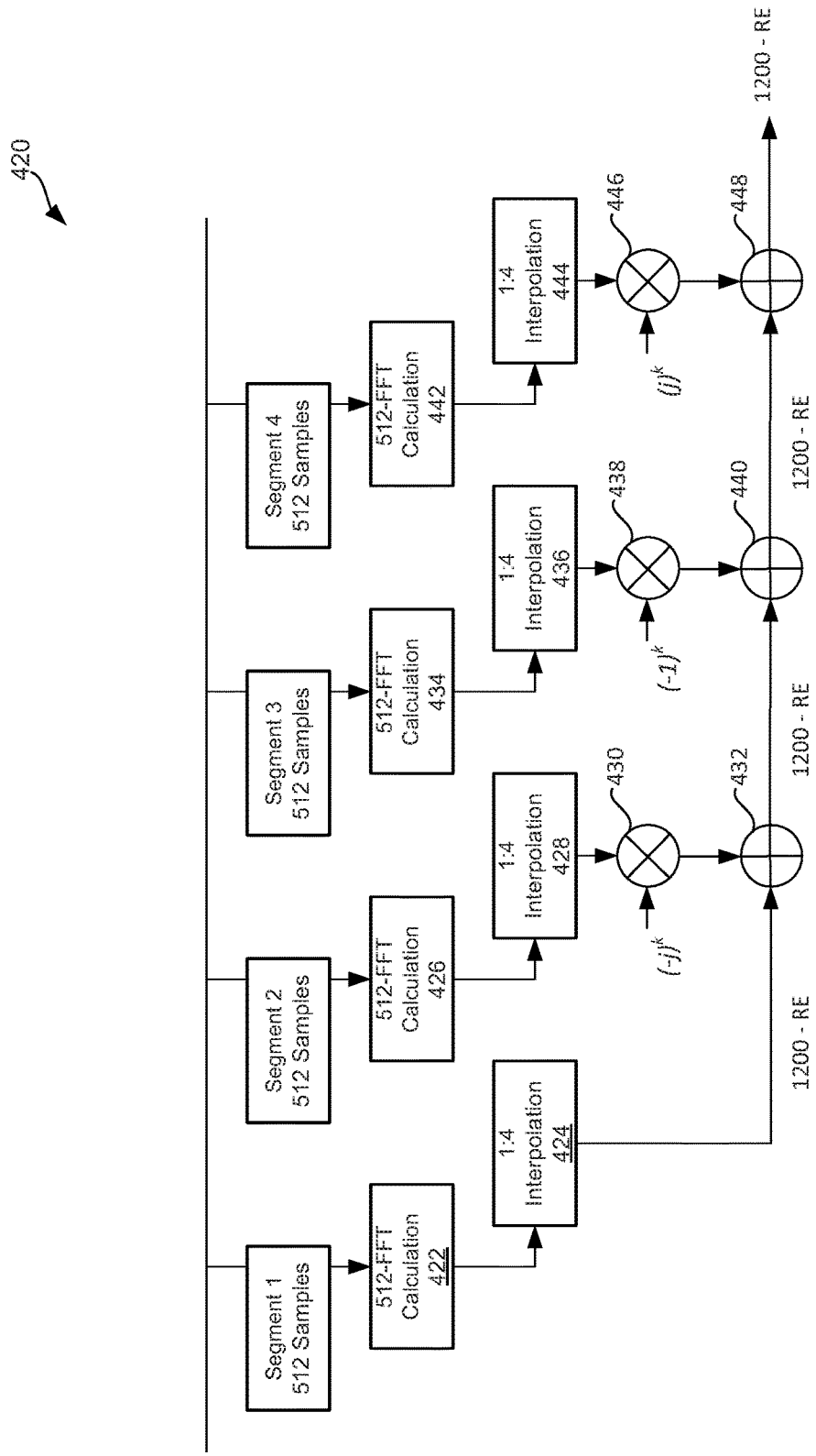
FIG. 10 is a logical block diagram describing an example of a segment-based FFT process in one embodiment using 1:4 interpolation.

FIG. 10 is a logical block diagram describing an example of segment-based FFT processing for an input signal symbol. FIG. 10 continues with an example of a 2048 point FFT calculation for an input symbol comprising 2048 samples. Additionally, FIG. 10 describes a division of the input signal into four segments of samples. The described principles are not so limited and may be applied in any suitable environment including input signals of any sample size and any number of partitions or segments (e.g., 2, 4, 6, etc.).

In FIG. 10, the input signal is received as sequential stream including a plurality of samples comprising a symbol of the input signal. The 2048 samples of the input signal symbol are divided into four equally-sized segments of 512 samples. Segment 1 includes the first 512 samples of the input signal that are received. The samples for Segment 1 can be stored in an input buffer before being transferred to the segment FFT calculation unit. When 512 samples are received, the first segment is transferred to the FFT calculation unit. A 512 point FFT calculation is performed for the samples of Segment 1 at box 422. All or a subset of the samples from the first segment may be used to perform the FFT at box 422. In one embodiment, a sequence of less than all of the samples from the first segment is used. For example, a sequence of every fourth sample (0:4:2047) can be selected from the segment and used in the calculation at box 422. The sample positions after sample 512 can be padded with zeros for the calculation at box 422.

At box 424, the result from box 422 is interpolated into a 1200 point intermediate FFT result. In one embodiment, the result from box 422 is interpolated into a 2048 point result. In another embodiment, the result from box 422 is interpolated into only 1200 point result. An interpolation into the 1200 point result can discard the remaining points as they represent zero padded data, providing guard bands around the user data at the 1200 points. The 1200 point intermediate FFT result is referenced as the 1200 REs that comprise the intermediate FFT result. After box 424, the interpolated 1200 REs are transferred to the accumulation unit for later accumulation with the intermediate FFT result from other segments.

When Segment 1 is transferred from the input buffer to the FFT segment calculation unit at box 422, samples for the second segment are sequentially received and stored in the input buffer. The second segment can be stored in the same memory location as the first segment since the first segment has been transferred to the calculation unit. When Segment 1 is transferred from the calculation unit after performing the 1:4 interpolation at box 424, Segment 2 is transferred from the input buffer to the calculation unit. A 512 point FFT calculation is performed for the samples of Segment 2 at box 426 in the same manner as described for Segment 1. At box 428, the results of the FFT at box 426 are interpolated into 1200 REs. The 1200 REs are multiplied by multiplication factor $(-j)^k$ as shown at 430. The multiplication factor is applied in accordance with the second term shown in equation 7. The multiplication at block 430 generates the intermediate FFT result for Segment 2. In one embodiment, the FFT calculation unit includes a multiplier that performs the multiplication at block 430.

The intermediate FFT result for Segment 1 and the intermediate FFT result for Segment 2 are accumulated at block 432. The 1200 REs for Segment 1 are added to the 1200 REs for Segment 2 in one embodiment. The individual REs are added to generate a 1200 point accumulated FFT result. Each RE in the accumulated result generated by the addition at block 432 represents a combined result of the corresponding REs from Segment 1 and Segment 2.

When Segment 2 is transferred from the input buffer to the FFT segment calculation unit at box 426, samples for Segment 3 are stored in the input buffer. Segment 3 can be stored in the same memory location used for Segment 1 and Segment 2. When Segment 2 is transferred from the calculation unit, Segment 3 is transferred to the calculation unit. A 512 point FFT calculation is performed for Segment 3 at box 434 in the same manner as described for Segment 1. At box 436, the results of the FFT at box 434 are interpolated into 1200 REs. The 1200 REs are multiplied by multiplication factor $(-1)^k$ as shown at block 438 and in equation 7. The multiplication at block 438 generates the intermediate FFT result for Segment 3.

The accumulated FFT result for Segments 1 and 2 are accumulated with the intermediate result of Segment 3 at block 440. The 1200 REs for Segment 3 are added to the 1200 REs from the accumulated results of Segments 1 and 2. The individual REs are added to generate a 1200 point accumulated FFT result for Segments 1, 2, and 3. Each RE in the accumulated result generated by the addition at block 440 represents a combined result of the corresponding REs from Segments 1, 2, and 3.

When Segment 3 is transferred from the input buffer, samples for Segment 4 are stored in the input buffer. Segment 4 can be stored in the same memory location used for Segments 1, 2, and 3. When Segment 3 is transferred from the calculation unit, Segment 4 is transferred to the calculation unit. A 512 point FFT calculation is performed for Segment 4 at block 442 in the same manner as described for Segment 1. At block 444, the results of the FFT at box 442 are interpolated into 1200 REs. The 1200 REs are multiplied by multiplication factor $(j)^k$ as shown at block 446 and in equation 7. The multiplication at block 446 generates the intermediate FFT result for Segment 4.

The accumulated FFT result for Segments 1, 2, and 3 are further accumulated with the intermediate result of Segment 4 at block 448. The 1200 REs for Segment 4 are added to the 1200 REs from the accumulated result of Segments 1, 2, and 3. The individual REs are added to generate a 1200 point accumulated FFT result for Segments 1, 2, 3, and 4. Each RE in the accumulated result generated by the addition at block 448 represents a combined result of the corresponding REs from Segments 1, 2, 3, and 4.

In one embodiment, FFT calculation unit 404 includes a single unit for performing the FFT calculations at blocks 422, 426, 434, and 442. Similarly, FFT calculation unit 404 can include a single interpolation unit for performing the interpolations at blocks 424, 428, 436, and 444. In another embodiment, multiple FFT calculation units 404 and/or interpolation units 424 may be used.

In one embodiment, FFT calculation unit 404 includes a multiplier that performs the multiplication at blocks 430, 438, and 446. A single multiplier circuit, for example, can be used to implement the multiplication at blocks 430, 438, and 446. Similarly, a single software component in a digital signal processor may be used to implement the multiplication. In one embodiment, accumulation unit 406 includes an adder that performs the addition shown at box 432, 440, and 448. A single adder circuit, for example, can be used to implement the addition at blocks 432, 440, and 448. Similarly, a single software component in a digital signal processor may be used to implement the addition.

Figure 11:
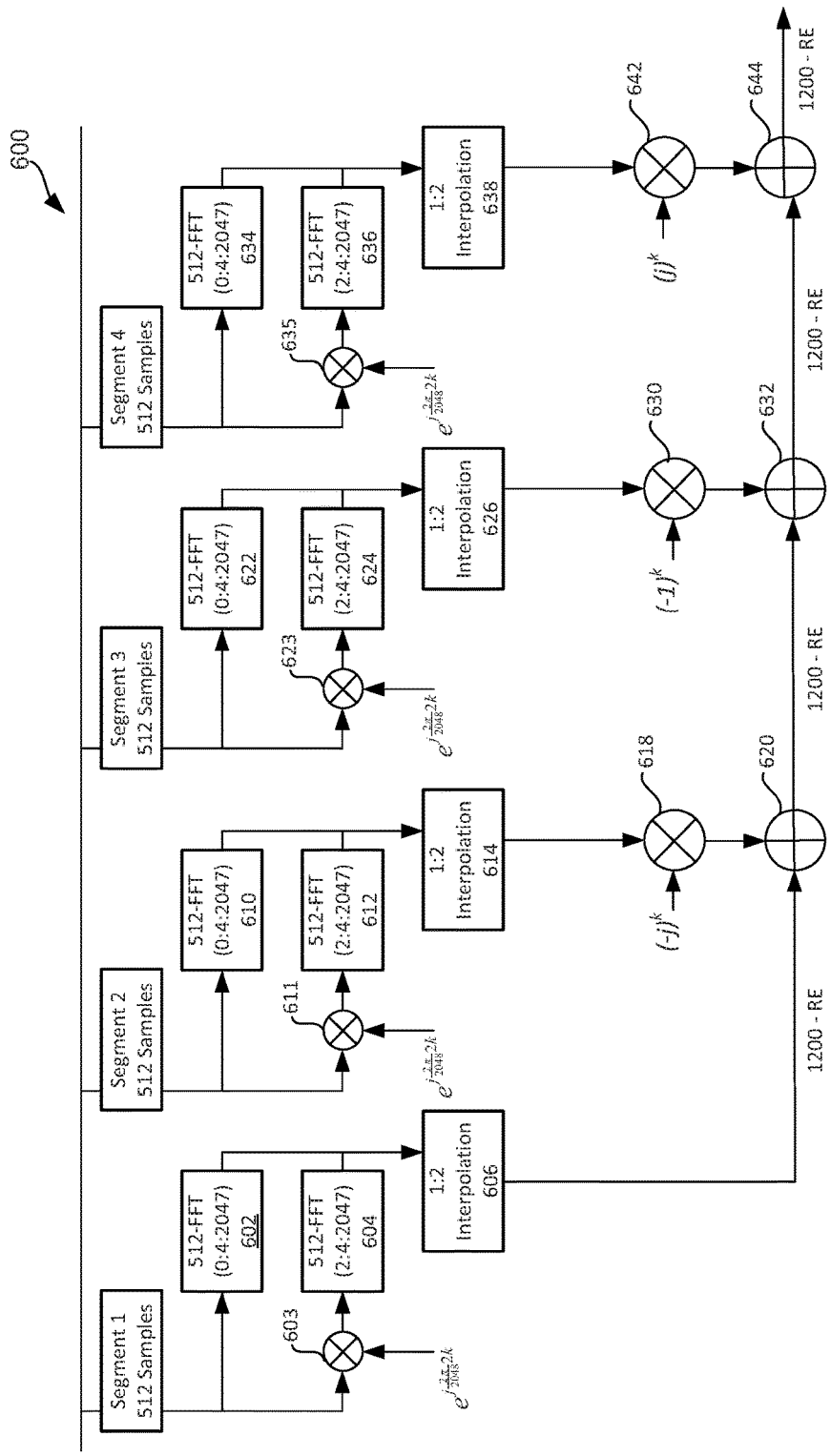
FIG. 11 is a logical block diagram describing an example of a segment-based FFT process in one embodiment using 1:2 interpolation.

FIG. 11 is a logical block diagram describing another example of a segment-based FFT process 600 for an input signal symbol. A 2048 point FFT calculation using four segments for an input symbol comprising 2048 samples is described, however any number of samples and segments may be used. In FIG. 10, two 512 point FFT calculations are performed for each segment. In this manner, a smaller interpolation factor (e.g., 1:2) can be used to provide a more accurate FFT result.

Segment 1 again includes the first 512 samples of the input signal and can be stored in an input buffer before being transferred to the segment FFT calculation unit. A 512 point FFT calculation is performed for the samples of Segment 1 at block 602. Specifically, a 512 point FFT calculation is performed for a subset of the samples of Segment 1. A subset of samples are selected according to the sequence (0:4:2047). The samples after 512 can be zero padded in the generation at block 602. A 512 point FFT result is generated.

A second 512 point FFT calculation is performed for a second sequence of samples from Segment 1 at block 604. The segment is first multiplied by a multiplication factor $$e^{j\frac{2\pi}{2048}2k}$$

at block 603. The multiplication factor at block 603 applies a rotation to the first segment of samples. A second 512 point FFT result is generated at box 604, which is interpolated as a second subset of samples for the sequence (2:4:2047). The result for the second sequence may be referred to as an intermediate rotation FFT result. The 512 point results from the first sequence and the second sequence are combined to form a 1024 point FFT result. In one embodiment, the 1024 point result undergoes a 1:2 interpolation at block 606 to generate a full 2048 point FFT result. In another embodiment, the 1024 point result undergoes a 1:2 interpolation at block 606 to generate a 1200 point FFT result, the points outside of the 1200 point are disregarded. The 1200 REs from the first segment are passed to block 620.

When Segment 1 is transferred from the input buffer to the FFT segment calculation unit at blocks 602 and 604, samples for the Segment 2 are sequentially received and stored in the input buffer. Segment 2 can be stored in the same memory location as the first segment since the first segment has been transferred to the calculation unit. When Segment 1 is transferred from the calculation unit after performing the 1:2 interpolation at box 606, for example, Segment 2 is transferred from the input buffer to the calculation unit.

A 512 point FFT calculation is performed for the samples of Segment 2 at block 610. A subset of samples are selected according to the sequence (0:4:2047). A second 512 point FFT calculation is performed for a second sequence (2:4:2047) of samples from Segment 2 at block 612. A second 512 point FFT result is generated at box 612, which is interpolated as a second subset of samples for the sequence (2:4:2047). The 512 point results from the first sequence and the second sequence are combined to form a 1024 point FFT result. The multiplication factor at block 611 applies a rotation to the segment of samples. In one embodiment, the 1024 point result undergoes a 1:2 interpolation at block 614 to generate a full 2048 point FFT result. In another embodiment, the 1024 point result undergoes a 1:2 interpolation at block 614 to generate a 1200 point FFT result, the points outside of the 1200 point are disregarded. The 1200 REs from the first segment are passed to block 618. The 1200 REs are multiplied by multiplication factor $(-j)^k$ as shown at 618, according to the second term of equation 7. The multiplication at block 618 generates the intermediate FFT result for Segment 2.

The intermediate FFT result for Segment 1 and the intermediate FFT result for Segment 2 are accumulated at block 620. The 1200 REs for Segment 1 are added to the 1200 REs for Segment 2 in one embodiment. The individual REs are added to generate a 1200 point accumulated FFT result. Each RE in the accumulated result generated by the addition at block 620 represents a combined result of the corresponding REs from Segment 1 and Segment 2.

When Segment 2 is transferred to the FFT segment calculation unit, samples for Segment 3 are stored in the input buffer. Segment 3 can be stored in the same memory location as the first segment since the first segment has been transferred to the calculation unit. When Segment 2 is transferred from the calculation unit after performing the 1:2 interpolation at block 614, for example, Segment 3 is transferred from the input buffer to the calculation unit.

A 512 point FFT calculation is performed for a first sequence (0:4:2047) of samples of Segment 3 at block 622. A second 512 point FFT calculation is performed for a second sequence (2:4:2047) of samples of Segment 3 at block 624. The multiplication factor at block 623 applies a rotation to the segment of samples. The 512 point FFT results from blocks 622 and 624 are combined to form a 1024 point FFT result. In one embodiment, the 1024 point result is interpolated at block 626 to generate a 2048 point FFT result. In another embodiment, the 1024 point result undergoes a 1:2 interpolation at block 626 to generate a 1200 point result. The 1200 REs from the first segment are passed to block 630. The 1200 REs are multiplied by multiplication factor $(-1)^k$, according to the third term of equation 7. The multiplication at block 630 generates the intermediate FFT result for Segment 3.

The intermediate FFT result for Segment 3 and the accumulated result of Segments 1 and 2 are accumulated at block 632. The 1200 REs for Segment 3 are added to the 1200 REs for the accumulated result of Segments 1 and 2 in one embodiment. Each RE in the accumulated result generated by the addition at block 632 represents a combined result of the corresponding REs from Segments 1, 2, and 3.

When Segment 3 is transferred to the FFT segment calculation unit, samples for Segment 4 are stored in the input buffer. Segment 3 can be stored in the same memory location as the first segment since the first segment has been transferred to the calculation unit. A 512 point FFT calculation is performed for a first sequence (0:4:2047) of samples of Segment 4 at block 638. A second 512 point FFT calculation is performed for a second sequence (2:4:2047) of samples of Segment 4 at block 636. The multiplication factor at block 635 applies a rotation to the segment of samples. The 512 point FFT results are combined to form a 1024 point FFT result. In one embodiment, the 1024 point result is interpolated at block 638 to generate a 2048 point FFT result. In another embodiment, the 1024 point result undergoes a 1:2 interpolation at block 638 to generate a 1200 point result. The REs are multiplied by multiplication factor $(j)^k$, according to the fourth term of equation 7. The multiplication at block 642 generates the intermediate FFT result for Segment 4.

The intermediate FFT result for Segment 4 and the accumulated result of Segments 1, 2, and 3 are accumulated at block 644. The 1200 REs for Segment 4 are added to the 1200 REs for the previously accumulated result. Each RE in the accumulated result generated by the addition at block 644 represents a combined result of the corresponding REs from Segments 1, 2, 3, and 4.

In one embodiment, FFT calculation unit 404 includes a single unit for performing the FFT calculations at blocks 602, 604, 610, 612, 622, 624, 634, and 636. In another embodiment, the FFT calculations at blocks 602, 610, 622, and 634 are performed by one FFT unit and another unit performs the FFT calculations at blocks 604, 612, 624, and 636. FFT calculation unit 404 can include a single interpolation unit for performing the interpolations at blocks 606, 614, 626, and 638.

In one embodiment, FFT calculation unit 404 includes a multiplier that performs the multiplications at blocks 618, 630, and 642. A single multiplier circuit, for example, can be used to implement the multiplications. Similarly, a single software component in a digital signal processor may be used to implement the multiplications. In one embodiment, accumulation unit 406 includes an adder that performs the additions shown at boxes 620, 632, and 644. A single adder circuit, for example, can be used to implement the additions. Similarly, a single software component in a digital signal processor may be used to implement the additions.

Figure 12:
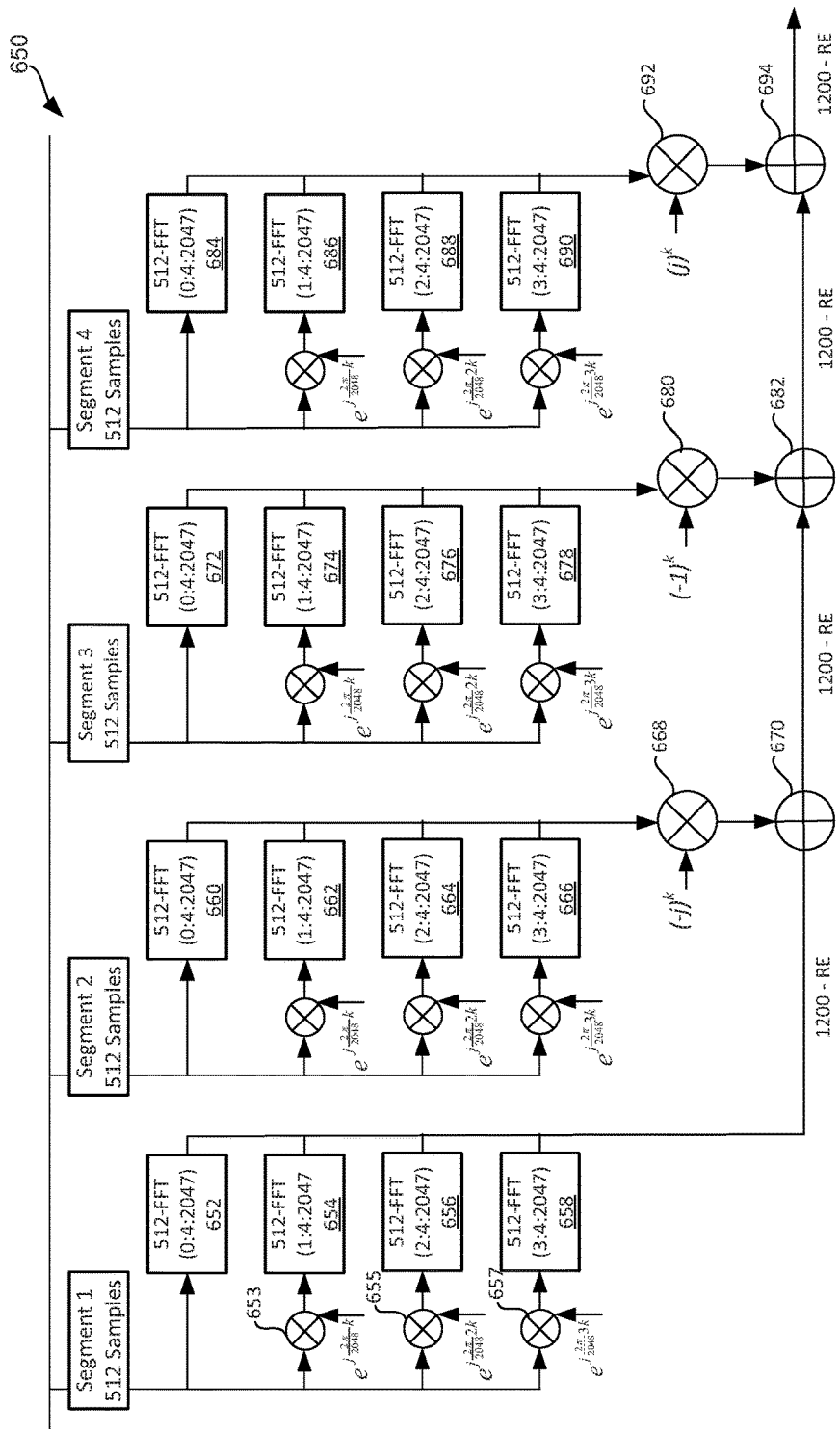
FIG. 12 is a logical block diagram describing an example of a segment-based FFT process in one embodiment without interpolation.

FIG. 12 is a logical block diagram describing another example of a segment-based FFT process 650 for an input signal symbol. A 2048 point FFT calculation using four segments for an input symbol comprising 2048 samples is described, but any number of samples and segments may be used. In FIG. 12, four 512 point FFT calculations are performed for each segment. By using four 512 point FFT calculations, a full 2048 point FFT result for the 2048 samples can be generated. In this manner, no interpolation is used in the final FFT result calculation. A more accurate FFT result can thus be provided, when compared with the FFT results from FIGS. 10 and 11.

Segment 1 includes the first 512 samples of the input signal. The samples are stored in an input buffer, then transferred to the segment FFT calculation unit when the number of samples for a segment of s symbol is received. Four 512 point FFT calculations are performed to generate a full 2048 point FFT result for the 2048 samples of the symbol. A 512 point FFT calculation is performed for a first sequence (0:4:2047) of samples from Segment 1 at block 652. A 512 point FFT result is generated.

A second 512 point FFT calculation is performed for a second sequence of samples from Segment 1 at block 654. The segment is multiplied by a multiplication factor $$e^{j\frac{2\pi}{2048}2k}$$

at block 653 to select a second sequence (2:4:2047) of samples. A second 512 point FFT result is generated at box 654. The multiplication factor at block 653 applies a rotation to the segment of samples.

A third 512 point FFT calculation is performed for a third sequence (2:4:2047) of samples from Segment 1 at block 656. The segment is multiplied by the multiplication factor $$e^{j\frac{2\pi}{2048}2k}$$

at block 655 to apply a rotation. A third 512 point FFT result is generated at box 658. A fourth 512 point FFT calculation is performed for a fourth sequence (32:4:2047) of samples from Segment 1 at block 658. The segment is multiplied by the multiplication factor $$e^{j\frac{2\pi}{2048}2k}$$

at block 657 to apply a rotation. A third 512 point FFT result is generated at box 658.

The 512 point results from the four sequences are combined to form a 2048 point FFT result. Because the full 2048 FFT result is generated, no interpolation is performed. In one embodiment, 1200 user data points from the 2048 can be selected to form 1200 REs. The 1200 REs from the first segment are passed to block 670.

Segment 2 is stored in the input buffer after segment 1 is transferred to the FFT calculation unit. Four 512 point FFT calculations are again performed for the samples of Segment 2 at blocks 660, 662, 664, and 666. The 512 point results from the four sequences are combined to form a 2048 point FFT result, from which the 1200 user REs are selected. The 1200 REs from the second segment are passed to block 668 where they are multiplied by multiplication factor $(-j)^k$. The multiplication at block 668 generates the intermediate FFT result for Segment 2.

The intermediate FFT result for Segment 1 and the intermediate FFT result for Segment 2 are accumulated at block 670. The 1200 REs for Segment 1 are added to the 1200 REs for Segment 2, generating a 1200 point accumulated FFT result.

Segment 3 is stored in the input buffer after segment 1 is transferred to the FFT calculation unit. Four 512 point FFT calculations are performed for the samples of Segment 3 at blocks 672, 674, 676, and 678. A FFT result of 1200 REs from the third segment are multiplied by multiplication factor $(-1)^k$ at block 680. The multiplication at block 680 generates the intermediate FFT result for Segment 3.

The intermediate FFT result for Segment 3 is accumulated with the previously accumulated result for Segments 1 and 2 at block 682. The 1200 REs for Segment 3 are added to the 1200 REs for the previously accumulated result.

Segment 4 is stored in the input buffer after segment 3 is transferred to the FFT calculation unit. Four 512 point FFT calculations are performed for the samples of Segment 4 at blocks 684, 686, 688, and 690. The 1200 REs from the FFT result are multiplied by multiplication factor $(j)^k$ at block 692. The multiplication at block 692 generates the intermediate FFT result for Segment 4.

The intermediate FFT result for Segment 4 is accumulated with the previously accumulated result for Segments 1, 2, and 3 at block 694. The 1200 REs for Segment 4 are added to the 1200 REs for the previously accumulated result.

In one embodiment, FFT calculation unit 404 includes a single unit for performing the FFT calculations at blocks 652, 654, 656, 658, 660, 662, 664, 666, 672, 674, 676, 678, 684, 686, 688, and 690. In another embodiment, the FFT calculations can be performed by two or more calculation units.

In one embodiment, FFT calculation unit 404 includes a multiplier that performs the multiplications at blocks 668, 680, and 692. A single multiplier circuit, for example, can be used to implement the multiplications. Similarly, a single software component in a digital signal processor may be used to implement the multiplications. In one embodiment, accumulation unit 406 includes an adder that performs the additions shown at boxes 670, 682, and 694. A single adder circuit, for example, can be used to implement the additions. Similarly, a single software component in a digital signal processor may be used to implement the additions.

Figure 13:
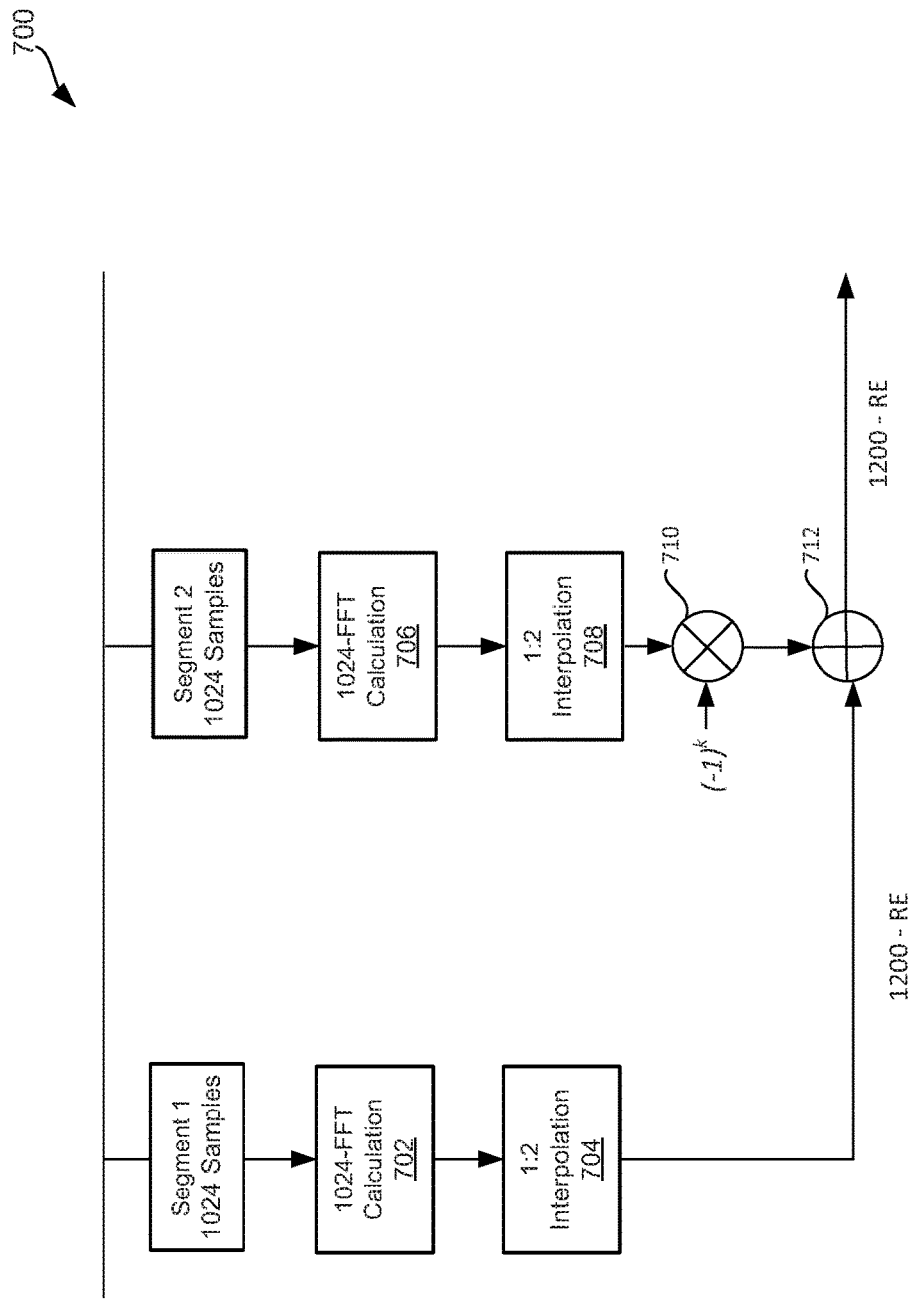
FIG. 13 is a logical block diagram describing an example of a segment-based FFT process in one embodiment with 1:2 interpolation.

FIG. 13 is a logical block diagram describing another example of a segment-based FFT process 700 for an input signal symbol. A 2048 point FFT calculation using two segments for an input symbol comprising 2048 samples is described in FIG. 13. In this example, two segments containing 1024 samples each are used so that a 1:2 interpolation is provided.

The 2048 samples of the input signal symbol are divided into two equally-sized segments of 1024 samples. The samples for Segment 1 can be stored in an input buffer before being transferred to the segment FFT calculation unit. A 1024 point FFT calculation is performed for the samples of Segment 1 at box 702. All or a subset of the samples from the first segment may be used to perform the FFT at box 702. A sequence of less than all of the samples from the first segment can be used.

At box 704, a 1:2 interpolation is applied to the result from block 702 to form a 1200 point intermediate result. An interpolation into the 1200 point result can discard the remaining 848 points as they represent zero padded data, providing guard bands around the user data at the 1200 points. The 1200 point intermediate FFT result is referenced as the 1200 resource or radio elements REs that comprise the intermediate FFT result. In another embodiment, the result from box 702 is interpolated into a 2048 point result. After box 704, the 1200 REs for the first intermediate result are transferred to the accumulation unit for accumulation with the result of Segment 2 at block 712.

When Segment 1 is transferred to the FFT segment calculation unit at block 702, samples for the second segment are stored in the input buffer. When Segment 1 is transferred from the calculation unit after performing the 1:2 interpolation at block 704, Segment 2 is transferred from the input buffer to the calculation unit.

A 1024 point FFT calculation is performed for the samples of Segment 2 at block 706 in the same manner as described for Segment 1. At block 708, the results of the FFT at block 706 are interpolated into 1200 REs. The 1200 REs are multiplied by multiplication factor $(-1)^k$ as shown at block 710. The multiplication at block 710 generates the intermediate FFT result for Segment 2. In another embodiment, the result from box 706 is interpolated into a 2048 point result.

The intermediate FFT result for Segment 1 and the intermediate FFT result for Segment 2 are accumulated at block 712. The 1200 REs for Segment 1 are added to the 1200 REs for Segment 2 in one embodiment. The individual REs are added to generate a 1200 point accumulated FFT result. Each RE in the accumulated result generated by the addition at block 712 represents a combined result of the corresponding REs from Segment 1 and Segment 2. The accumulated 1200 point result can be stored in the output buffer.

Figure 14:
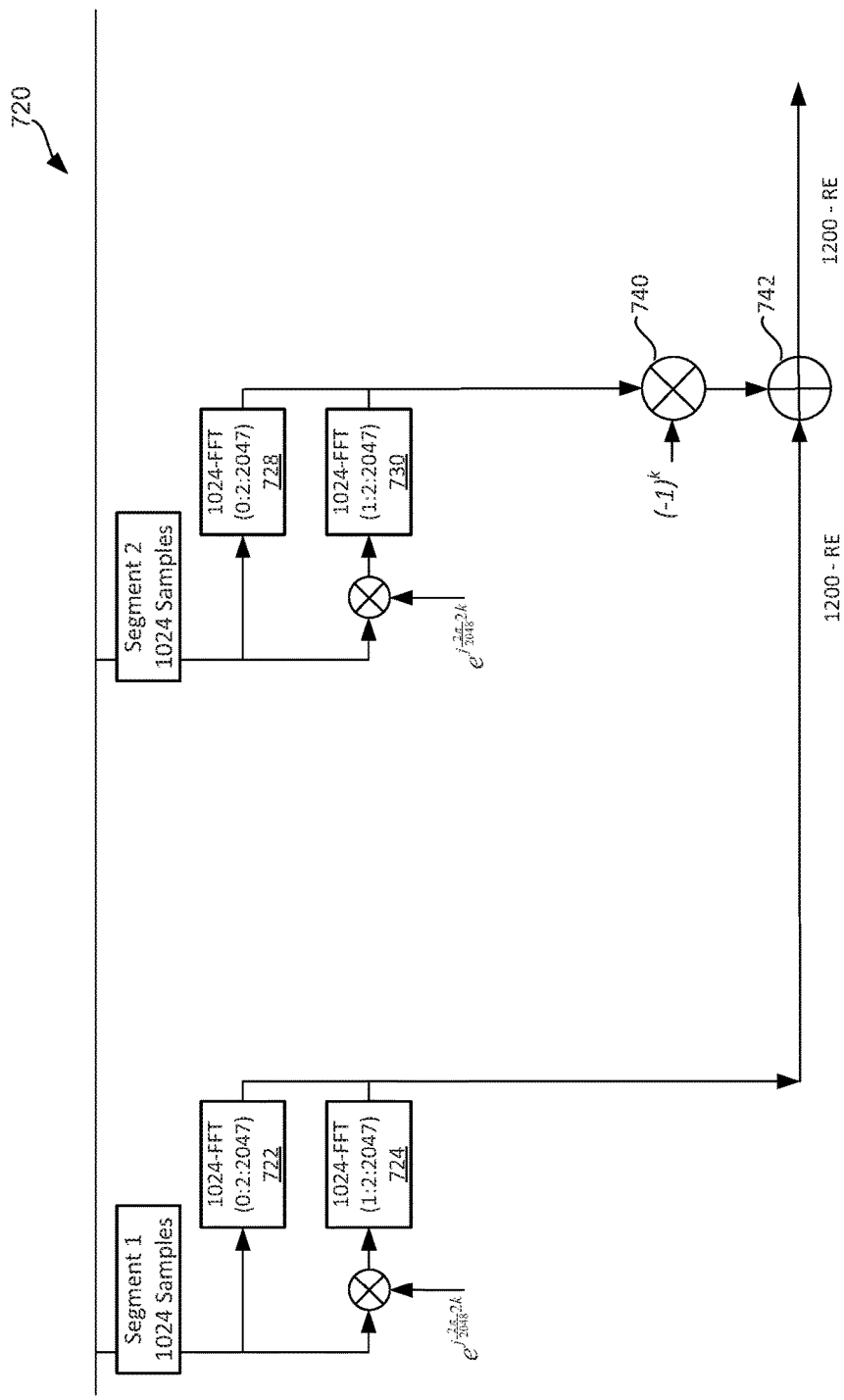
FIG. 14 is a logical block diagram describing an example of a segment-based FFT process in one embodiment without interpolation.

FIG. 14 is a logical block diagram describing another example of a segment-based FFT process 720 for an input signal symbol using two segment for a 2048 point FFT calculation.

The 2048 samples of the input signal symbol are divided into two equally-sized segments of 1024 samples. In FIG. 14, two 1024 point FFT calculations are performed for each segment. In this manner, a full 2048 point FFT result can be generated from the 2048 samples of the input signal so that no interpolation is applied.

Segment 1 includes the first 1024 samples of the input signal. A 1024 point FFT calculation is performed for Segment 1 at block 722. A 1024 point FFT calculation is performed for a subset of the samples of Segment 1. A subset of samples are selected according to the sequence (0:2:2047). A 1024 point FFT result is generated A second 1024 point FFT calculation is performed for a second sequence of samples from Segment 1 at block 724. The segment is multiplied by a multiplication factor $$e^{j\frac{2\pi}{2048}2k}$$

at block 723 to select a second sequence (1:2:2047) of samples by applying a rotation. A second 1024 point FFT result is generated at box 724.

The 1024 point results from the two sequences are combined to form a 2048 or 1200 point FFT result. Because the full 2048 FFT result is generated, no interpolation is performed. In one embodiment, 1200 user data points from the 2048 can be selected to form 1200 REs. The 1200 REs from the first segment are passed to block 742.

Segment 2 is stored in the input buffer after segment 1 is transferred to the FFT calculation unit. Two 1024 point FFT calculations are again performed for the samples of Segment 2 at blocks 728 and 730. The 1024 point result from the two sequences are combined to form a 2048 point FFT result, from which the 1200 user REs are selected. The 1200 REs from the second segment are passed to block 740 where they are multiplied by multiplication factor $(-1)^k$. The multiplication at block 742 generates the intermediate FFT result for Segment 2.

The intermediate FFT result for Segment 1 and the intermediate FFT result for Segment 2 are accumulated at block 742. The 1200 REs for Segment 1 are added to the 1200 REs for Segment 2, generating a 1200 point accumulated FFT result.

Figure 15:
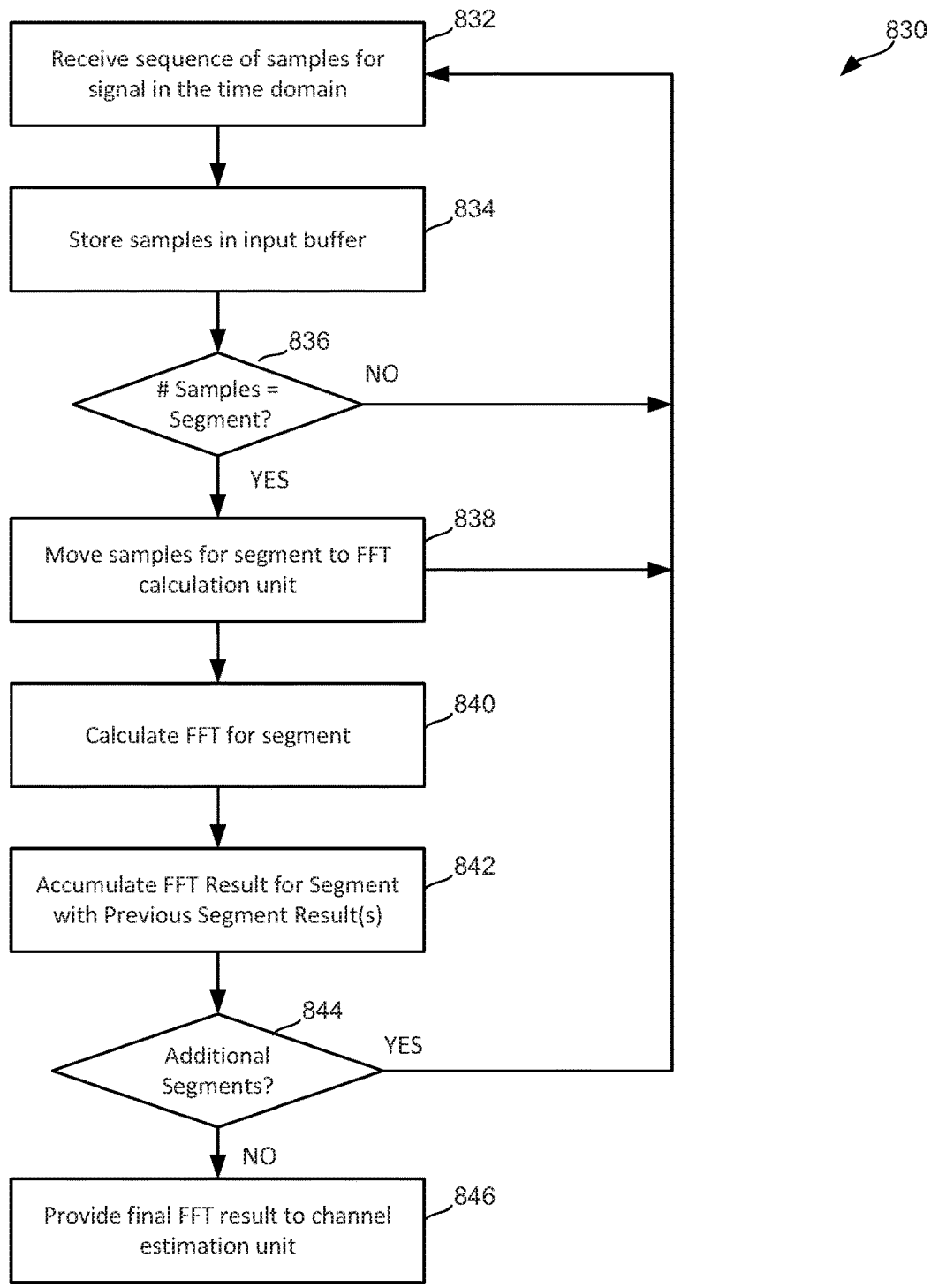
FIG. 15 is a flowchart describing a process of generating a final FFT result using a segment-based process in one embodiment.

FIG. 15 is a flowchart describing a process 830 of segment-based FFT processing for input signal symbols. Process 830 may be performed in the environment of FIG. 1 using an FFT unit, implemented as part of a hardware acceleration circuit or digital signal processor, for example. Process 830, however is not limited to being performed in such an environment. Process 830 may be performed by various elements in FIG. 7, but is not limited to such an example. Process 830 may be performed as part of generating a final FFT result as described in process 800 at step 806. Process 830 may be performed by a segment calculation unit and/or accumulation unit implemented as a one or more circuits, in a hardware acceleration circuit for example. Alternatively, the process may implemented in a digital signal processor, as processor readable code for programming a processor for example.

At step 832, a sequence of samples for an input signal in the time domain is received. At step 834, the samples are stored in an input buffer. It is noted that steps 832 and 834 can be performed at any time. For example, steps 832 and 834 may be performed continuously to store samples from an input signal as they are received.

At step 836, the system determines whether the number of samples stored in the input buffer is equal to a predetermined number for a segment. If the number of samples in the input buffer is not equal to the number for a segment, the system continues to receive and store samples at steps 832 and 834, respectively.

If the number of samples in the input buffer is equal to the number for a segment, the system transfers the samples for the current segment to the FFT calculation unit at step 838. As noted, from step 838 the process continues to step 832 to receive additional samples, while also continuing at step 840 to calculate the FFT for the current segment. The samples for the segment are processed to determine an intermediate FFT result for the segment. The process at step 840 may include the FFT of the input samples. Additional processes may also be performed. For example, step 840 may include various rotations and/or interpolations of the input data. Step 840 may include performing the FFT using all of the samples or only a subset of the samples for the segment. Zero padding may be used, for example, to represent sample positions for the symbol for which input data has not been received. In one embodiment, step 842 includes generating an intermediate FFT result having a number of points that is greater than the number of samples in the segment. For example, a 2048 point result may be generated from 512 samples in a segment. The 2048 point result may be reduced to a 1200 point result by discarding REs corresponding to guard bands that don't represent user data.

At step 842, the intermediate FFT result for the segment is accumulated with the intermediate FFT result(s) of any previous segments. Step 842 may include adding corresponding REs from each of the intermediate FFT results. In one embodiment, step 842 includes generating an intermediate or final FFT result having a number of points that is greater than the number of samples in the individual segments.

At step 844, the system determines whether additional segments for the symbol of the input signal remain to be processed. If additional segments remain, the process continues at step 832. If all of the segments have been processed and the results accumulated, the final FFT result is provided by the FFT unit at step. In one embodiment, step 846 includes transferring the final FFT result from accumulation unit 406 or output buffer 408 to a channel estimation circuit.

With reference to FIG. 7, FFT segment calculation unit 404 is one example of a means for receiving a plurality of samples corresponding to a symbol of an input signal for baseband generation using a FFT. An antenna or communication interface are also means for receiving samples. FFT segment calculation unit 404 is one example of a means for generating an intermediate FFT result for each of a plurality of segments of the plurality of samples. Accumulation unit 406 is one example of a means for determining a final FFT result for the input signal symbol based on an accumulation of the intermediate FFT result for each of the plurality of segment. A baseband system is one example of a means for generating from the input signal the baseband signal based on the final FFT result. A link/application system is also an example of a means for generating a baseband signal. Other means may include a HAC or DSP.

FFT segment calculation unit 404 is one example of a means for sequentially receiving at a signal processing circuit a plurality of samples for an input signal in the time domain, means for storing a first segment of samples of the plurality in a first memory location, means for performing a fast fourier transform for the first segment of samples, means for storing a second segment of samples of the plurality in the first memory location after beginning the FFT for the first subset, and means for performing a FFT for the second segment of samples after storing the second segment of samples in the first memory location. Baseband system 104 is one example of a means for generating a baseband signal based on an accumulation of the FFT for the first segment and the FFT for the second segment. Other means may include a HAC or DSP.

FFT segment calculation unit 404 is one example of a means for receiving a plurality of samples corresponding to a symbol of an input signal for generating a baseband signal using a fast fourier transform (FFT), and means for generating an intermediate FFT result for each of a plurality of segments of the plurality of samples. Accumulation unit 406 is one example of a means for determining a final FFT result for the input signal symbol based on a combination of the intermediate FFT result for each of the plurality of segments. Baseband system 104 is one example of a means for generating from the input signal the baseband signal based on the final FFT result. Other means may include a HAC or DSP.

Figure 16:
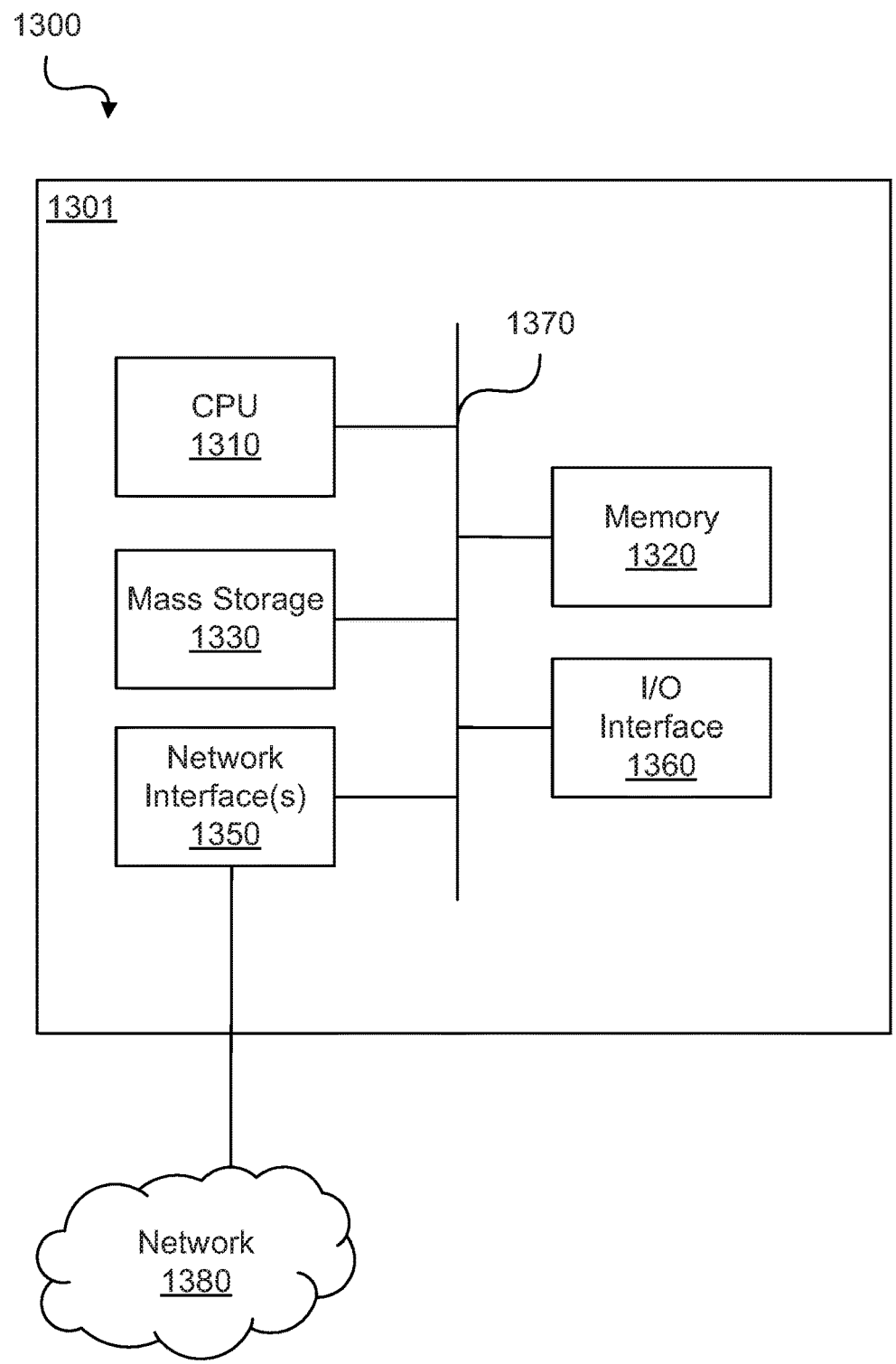
FIG. 16 is a block diagram of a computing system.

FIG. 16 is a high level block diagram of a computing system 1300 that can be used to implement various embodiments. In one example, computing system 1300 is a network system 1300. Specific devices may utilize all of the components shown, or only a subset of the components, and levels of integration may vary from device to device. Furthermore, a device may contain multiple instances of a component, such as multiple processing units, processors, memories, transmitters, receivers, etc.

The network system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like. Processing unit 1301 may be used to implement any of the computing devices described herein, such as base station 58 and/or user equipment 56.

The CPU 1310 may comprise any type of electronic data processor. The CPU 1310 may be configured to implement any of the schemes described herein, such as the processes illustrated in FIGS. 9-15 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "network interface" will be understood to include a port.

The processing unit 1301 may be configured to implement any of the schemes described herein, such as the processes illustrated in FIGS. 9-15 using any one or combination of steps described in the embodiments.

The components depicted in the computing system of FIG. 16 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 1320 or mass storage 1330) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The computer-readable non-transitory media includes all types of computer readable media, including magnetic storage media, optical storage media, and solid state storage media and specifically excludes signals. It should be understood that the software can be installed in and sold with a router, client, or other network device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers. In embodiments, the term "unit" may include a circuit (or integrated circuit) or software component.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. A device, comprising:
   an antenna configured to receive a plurality of samples corresponding to a symbol of an input signal for baseband signal generation using a fast fourier transform (FFT); and
   a signal processing circuit coupled to the antenna and configured to
      generate an intermediate FFT result for each of a plurality of segments formed by partitioning the plurality of samples, comprising
         generate from a first segment of samples a first subset of radio elements for the baseband signal,
         interpolate the first subset of radio elements to generate a first set of radio elements having a number of radio elements that is greater than a number of samples in the first segment,
      determine a final FFT result for the input signal symbol based on an accumulation of the intermediate FFT results for each of the plurality of segments, and
      generate the baseband signal based on the final FFT result.

2. The device of claim 1, wherein a number of the plurality of segments of the plurality of samples is an even number.

3. The device of claim 2, further comprising a memory storing a number of samples in a segment.

4. The device of claim 3, wherein the signal processing circuit is further configured to interpolate the intermediate FFT result for each of the plurality of segments to generate an interpolated segment for each of the plurality of segments; and determine a final FFT result for the input signal symbol based on an accumulation of the interpolated segment for each of the plurality of segments.

5. The device of claim 1, further comprising:
   a memory;
   wherein the signal processing circuit is configured to store a first segment of the plurality of samples in the memory; and
   wherein the signal processing circuit is configured to store a second segment of the plurality of samples in the memory after moving the first segment for generating an intermediate FFT result.

6. The device of claim 5, wherein:
   the signal processing circuit is configured to store the second segment of samples in the memory during generating the intermediate FFT result for the first segment of the plurality of samples.

7. The apparatus of claim 1, wherein the signal processing circuit includes a fast fourier transform (FFT) circuit configured to generate the individual FFT results and determine the final FFT result.

8. The apparatus of claim 1, wherein the signal processing circuit is further configured to generate an intermediate rotation FFT result for a rotation of each of the plurality of segments of the plurality of samples; and determine a final FFT result for the input signal symbol based on an accumulation of the intermediate FFT result for each of the plurality of segments and the intermediate rotation FFT result for the rotation of each of the plurality of segments.

9. A method for digital signal processing, comprising:
   sequentially receiving, at a signal processing circuit, a plurality of samples for an input signal in the time domain;
   storing a first segment of the plurality of samples in a memory, the first segment formed by partitioning the plurality of samples;
   performing a fast fourier transform (FFT) for the first segment comprising
      generating from the first segment a first subset of radio elements for the baseband signal; and
      interpolating the first subset of radio elements to generate a first set of radio elements having a number of radio elements that is greater than a number of samples in the first segment;
   storing a second segment of the plurality of samples in the memory after beginning the FFT for the first segment, the second segment formed by partitioning the plurality of samples;
   performing a FFT for the second segment; and
   generating a baseband signal based on an accumulation of the FFT for the first segment and the FFT for the second segment.

10. The method of claim 9, wherein:
    storing the second segment of samples includes storing the second segment during said performing the FFT for the first segment.

11. The method of claim 9, wherein performing a FFT for the second segment comprises:
    generating from the second segment of samples a second subset of radio elements for the baseband signal; and
    interpolating the second segment of radio elements to generate a second set of radio elements having a number of radio elements that is greater than a number of samples in the second segment.

12. The method of claim 11, wherein:
    generating the first subset of radio elements includes performing a first FFT for a first sequence of the first segment of samples and performing a second FFT for a second sequence of the first segment of samples; and performing the second FFT for the second sequence includes applying a rotation to the first segment of samples.

13. The method of claim 12, further comprising:

accumulating the FFT of the first segment and the FFT of the second segment by adding the first set of radio elements and the second set of radio elements.

14. A non-transitory computer-readable medium storing computer instructions for digital signal processing, that when executed by one or more processors, cause the one or more processors to perform the steps of:

receive a plurality of samples corresponding to a symbol of an input signal for generating a baseband signal using a fast fourier transform (FFT);

generate an intermediate FFT result for each of a plurality of segments of the plurality of samples, the plurality of samples partitioned to form each of the plurality of segments, comprising generate from a first segment of samples a first subset of radio elements for the baseband signal; and interpolate the first subset of radio elements to generate a first set of radio elements having a number of radio elements that is greater than a number of samples in the first segment;

determine a final FFT result for the input signal symbol based on a combination of the intermediate FFT result for each of the plurality of segments; and generate the baseband signal based on the final FFT result.

15. The non-transitory computer-readable medium of claim 14, wherein the instructions cause the one or more processors to perform the steps of:

store the first segment of the plurality of samples in a memory; and store a second segment of the plurality of samples in the memory after moving the first segment for generating an intermediate FFT result.

16. The non-transitory computer-readable medium of claim 15, wherein the instructions cause the one or more processors to perform the step of:

store the second segment of samples in the memory during generating the intermediate FFT result for the first segment of the plurality of samples.

17. The non-transitory computer-readable medium of claim 15, wherein the step of generate an intermediate FFT result for the second segment comprises:

generate from the second segment of samples a second subset of radio elements for the baseband signal; and interpolate the second segment of radio elements to generate a second set of radio elements having a number of radio elements that is greater than a number of samples in the second segment.

18. The non-transitory computer-readable medium of claim 17, wherein:

the step of generate the first subset of radio elements includes the steps of perform a first FFT for a first sequence of the first segment of samples and perform a second FFT for a second sequence of the first segment of samples; and the step of perform the second FFT for the second sequence includes the step of apply a rotation to the first segment of samples.

* * * * *